United States Patent
Cassway et al.

(10) Patent No.: US 11,198,383 B2
(45) Date of Patent: Dec. 14, 2021

(54) INFLATABLE BAG-ASSISTED LIFT FRAME FOR VEHICLE

(71) Applicant: Demountable Concepts, Inc., Glassboro, NJ (US)

(72) Inventors: Rustin Arthur Cassway, Cherry Hill, NJ (US); Albert Stephen Perry, Mullica Hill, NJ (US); David John Fisher, Berlin, NJ (US)

(73) Assignee: Demountable Concepts, Inc., Glassboro, NJ (US)

( * ) Notice: Subject to any disclaimer, the term of this patent is extended or adjusted under 35 U.S.C. 154(b) by 88 days.

(21) Appl. No.: 16/045,697

(22) Filed: Jul. 25, 2018

(65) Prior Publication Data

US 2020/0031266 A1 Jan. 30, 2020

(51) Int. Cl.
*B60P 1/02* (2006.01)
*B62D 63/04* (2006.01)
*B60P 1/64* (2006.01)

(52) U.S. Cl.
CPC .............. *B60P 1/02* (2013.01); *B60P 1/6427* (2013.01); *B62D 63/04* (2013.01)

(58) Field of Classification Search
CPC ................................ B60P 1/6427; B60P 1/02
See application file for complete search history.

(56) References Cited

U.S. PATENT DOCUMENTS

| 3,262,678 A | 7/1966 | Hand | |
| 3,580,609 A * | 5/1971 | Paielli | B62D 53/0807 |
| | | | 280/407.1 |
| 3,717,273 A * | 2/1973 | Berends | B60P 1/02 |
| | | | 280/425.1 |

(Continued)

FOREIGN PATENT DOCUMENTS

| CN | 87214886 U | 8/1988 |
| CN | 202200799 U | 4/2012 |

(Continued)

*Primary Examiner* — Nicole T Verley
(74) *Attorney, Agent, or Firm* — Calderone Bullock LLC

(57) ABSTRACT

Lift frames for a vehicle in this disclosure may include a frame body on a top portion of a frame, the frame body extending from a first end to a second end; a lift mechanism moveable with respect to the first end of the frame body, the lift mechanism comprising: a lift body having a first end and a second end, a lifting surface on the first end of the lift body and the second end of the lift body being positioned so as to be movable with respect to the first end of the frame body, wherein the lifting surface is positioned to engage an underside of a cargo container when placed on an upper side of the frame body; and an inflatable air bag having an upper side and a lower side and mounted on the lower side to a platform positioned on the frame beneath the lift body, wherein the inflatable air bag is connected on the upper side thereof to a mounting surface attached to the lift body; and a source of compressed air in fluid communication with the inflatable air bag. Such lift frames may include one or more such lift mechanisms associated with the compressed air source and the lift frames may be used to load and unload cargo containers locked and supported by the lift frames in transit and unlocked and detached from the lift frames when delivered in an easy and safe manner.

33 Claims, 17 Drawing Sheets

(56) References Cited

U.S. PATENT DOCUMENTS

| | | | |
|---|---|---|---|
| 3,752,502 A | | 8/1973 | Ehler |
| 3,763,514 A | * | 10/1973 | Bishop ............... B65G 69/2841 14/71.3 |
| 4,149,469 A | * | 4/1979 | Bigler ..................... A63G 3/00 104/73 |
| 4,238,003 A | * | 12/1980 | Hunter ................... B66F 7/243 254/88 |
| 4,572,579 A | * | 2/1986 | Saito ....................... B60P 1/16 254/93 HP |
| 4,580,806 A | * | 4/1986 | Kolstad ............... B62D 53/0807 280/407 |
| 4,921,074 A | * | 5/1990 | Ochs ........................ B66F 7/26 187/204 |
| 5,299,906 A | * | 4/1994 | Stone ...................... B65G 1/07 187/269 |
| 5,326,215 A | * | 7/1994 | Eberhardt ................ B60P 3/07 410/29.1 |
| 5,328,198 A | * | 7/1994 | Adams ............... B62D 53/0821 267/35 |
| 5,419,534 A | * | 5/1995 | Vesely ................. B66F 7/0625 254/9 C |
| 5,500,968 A | * | 3/1996 | Hodges ............... B65G 69/2823 14/71.7 |
| 5,509,687 A | * | 4/1996 | Thorndike ................ B60S 9/12 254/419 |
| 5,542,806 A | * | 8/1996 | Kang ................... B66F 7/0633 187/273 |
| 5,560,684 A | * | 10/1996 | Gilmore ................... B60P 1/16 298/19 B |
| 5,639,106 A | * | 6/1997 | Vitale .................. B62D 53/0807 280/407 |
| 5,649,491 A | * | 7/1997 | Zaguroli, Jr. ............ B65G 7/08 108/7 |
| 5,765,859 A | * | 6/1998 | Nowell .................... B60G 7/00 280/43.17 |
| 5,887,880 A | * | 3/1999 | Mullican .................. B60G 3/14 280/124.116 |
| 5,934,414 A | * | 8/1999 | Staczek .................... B66B 9/02 187/269 |
| 5,996,156 A | * | 12/1999 | Massey ............... B65G 69/2823 14/71.3 |
| 6,199,876 B1 | * | 3/2001 | Eckelberry .......... B60G 17/005 280/6.151 |
| 6,254,192 B1 | * | 7/2001 | Spreitzer ................... B60P 1/16 298/19 R |
| 6,286,812 B1 | * | 9/2001 | Cherry .................... B66F 7/065 254/122 |
| 6,360,393 B1 | * | 3/2002 | Fritz .................. B65G 69/2817 14/69.5 |
| 6,435,098 B1 | * | 8/2002 | Peterson ................... B61F 5/14 104/2 |
| 6,460,212 B2 | * | 10/2002 | Massey ............... B65G 69/2817 14/69.5 |
| 6,711,774 B2 | * | 3/2004 | Hodges ............. B65G 69/2817 14/71.3 |
| 6,786,158 B2 | | 5/2004 | Jacob |
| 6,918,151 B2 | * | 7/2005 | Massey ............. B65G 69/2823 14/69.5 |
| 6,918,575 B2 | * | 7/2005 | Cadrain ..................... B66F 3/35 254/88 |
| 7,063,494 B2 | * | 6/2006 | Smith, Jr. ............... B60P 1/431 414/401 |
| 7,281,728 B1 | * | 10/2007 | Wayrynen ............. B60P 3/1066 280/124.158 |
| 7,416,378 B1 | * | 8/2008 | Adams .................. B60P 1/6445 254/93 HP |
| 7,503,089 B2 | * | 3/2009 | Muhl ................. B65G 69/2817 14/69.5 |
| 7,819,619 B2 | | 10/2010 | Cassway |
| 7,845,668 B2 | | 12/2010 | Bergeron |
| 8,235,403 B2 | * | 8/2012 | VanDenberg .......... B60G 3/145 280/124.116 |
| 8,813,978 B2 | | 8/2014 | Cassway et al. |
| 9,663,013 B2 | | 5/2017 | Chen et al. |
| 10,457,186 B2 | * | 10/2019 | Luchsinger ............. B60P 3/122 |
| 2003/0170096 A1 | * | 9/2003 | Alexander ........... B65G 69/003 414/401 |
| 2004/0089192 A1 | | 5/2004 | Jacob |
| 2004/0221404 A1 | * | 11/2004 | Bender ............... B65G 69/2817 14/69.5 |

FOREIGN PATENT DOCUMENTS

| | | |
|---|---|---|
| CN | 202518146 U | 11/2012 |
| CN | 202827031 U | 3/2013 |
| CN | 203623812 U | 6/2014 |
| GB | 2355247 | 4/2001 |
| GB | 2358173 B | 6/2004 |
| KR | 10-0586838 B1 | 6/2006 |

\* cited by examiner

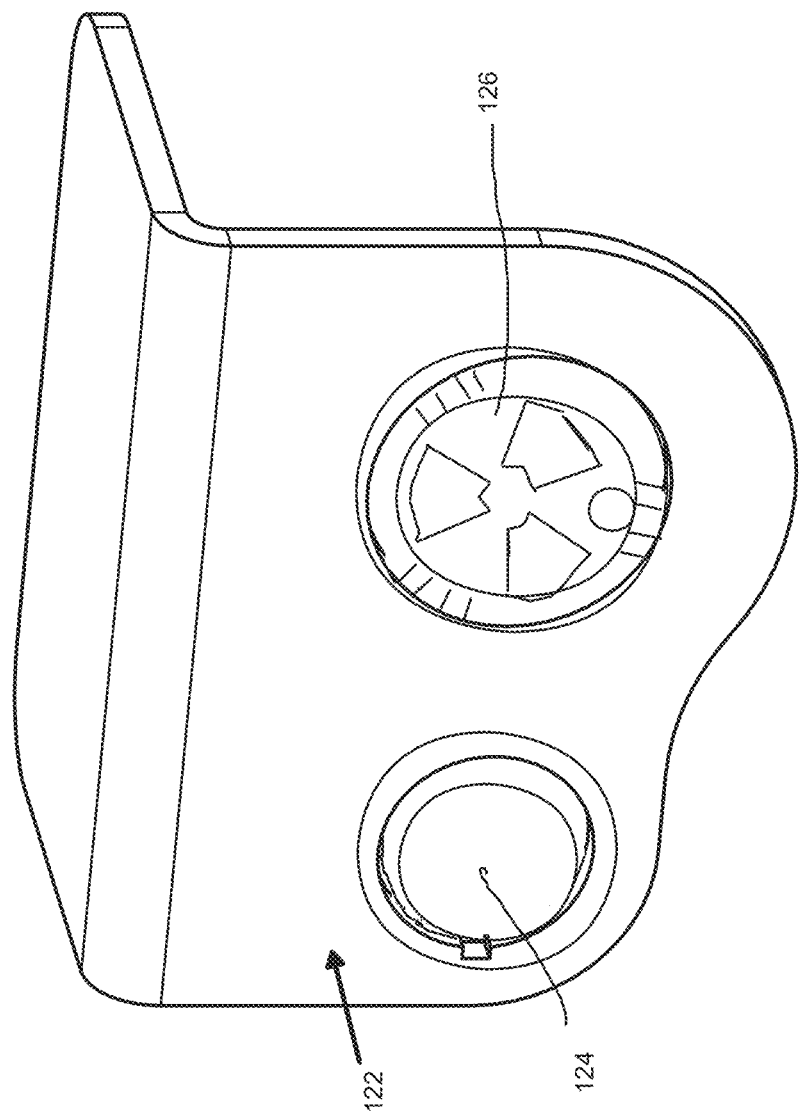

INFLATABLE BAG-ASSISTED LIFT FRAME FOR VEHICLE

BACKGROUND OF THE INVENTION

Field of the Invention

The invention is related to the field of vehicle frames used for supporting removable loads such as a cargo body on a vehicle, and particularly related to improving a frame lift device for assisting the lifting function to protect cargo and a cargo body in use.

Description of Related Art

Vehicles such as tractor trailer trucks that are used for hauling cargo, may have either detachable semitrailers that include cargo loaded bodies such as containers or boxes, wherein the semitrailers having a wheel base and/or may have include trailer frames that can support a cargo body (such as a container, box or other load). In a tractor trailer, the semitrailer is typically attached via a fifth wheel coupling. For detachable cargo bodies, unloading and reloading can be time-consuming. This can be particularly an issue also when the tractor trailer is dropping off a container and will do the next delivery using a different cargo body that has to be loaded on the trailer chassis frame. Lift mechanisms have been developed in the art to make such cargo loading and unloading easier.

Solutions for easing this task have been presented over time. For example, U.S. Pat. No. 3,752,502 teaches addition of two pallets with lifting devices placed near two fifth wheel coupling assemblies on a pole trailer. Legs are extended beneath the pole trailer for unloading, and the lifting device near each fifth wheel coupling is raised to engage the pallet. The lifting devices are each an inflatable air bag attached to two metal plates mounted to the bottom of the fifth wheel coupling assembly and to the trailer frame in a box-like structure formed using hinge plates. The bags are inflated and deflated independently to assist in lifting. Braking cylinders are used to lock the plates which are generally flat.

U.S. Pat. No. 9,663,013 discloses a specialty frame having a frame body using an inflatable air bag as a lifting mechanism mounted on a mounting plate and including a set of guides.

Chinese Utility Model 202518146 U discloses an airlift inflation balloon and a rotary bearing wherein the entire trailer is lifted from a parked vehicle using only a central lift. A rotary, revolving bearing and a carrier plate operate on the air lift.

A dump truck lift for dumping a load by tilting is shown in Chinese Utility Model 87 2 14886 U, wherein a pneumatic transmission uses waste gas from the vehicle engine to power a lift device. The carriage bottom of the dumping portion of the truck is thrust upward by an air bag over its full length to improve stress on the bottom beam of the vehicle carriage and reduce deadweight of the vehicle.

Great British Patent Publication No. GB 2 355 247 A teaches a tipping trailer that tilts relative to the chassis by an inflating air bag, as with the above-noted Chinese Utility Model, it is powered by vehicle waste gas. The box of the trailer is tilted and the flap for dumping contents dumps off the back of the truck.

Chassis lifts are known that incorporate hydraulic lifts and locking hooks into a chassis frame. Such a device can be used with vans, curtain-sided, refrigerated, flatbed and container trucks. In use, a driver with a full load, sets his or her parking brake, and turns on a safety cut switch, and exits the cab of the truck. The electrical connections are unplugged and a locking lever is then used to unlock the body (i.e., to release the locking hooks). The chassis lift is then activated and raises the cargo body higher than the base of the chassis. Stowable legs are slid out of their stowed area by the driver. The legs are adjusted to compensate for terrain and locked into place. The chassis lift is then lowered and the truck cab pulls away leaving the cargo body standing independently on the four legs. The same procedure can be reversed to re-load the same or a different cargo container or box on the chassis for a second load. Such a device is made and sold by Demountable Concepts Inc., of Glassboro, N.J.

Airbag chassis lift systems of the prior art while possibly useful when tilting is desired, are difficult to control in a stable manner when lifting a cargo container or box off of a chassis. Stability and air control as well as pressurization control in heavier loads have presented issues. While other chassis lifts are known, weight distribution can also create unnecessary wear on lift mechanisms.

Thus there remains a need in the art for a chassis or frame lift mechanism that allows for stable weight distribution and lifting while demounting a cargo container or box from a semitrailer or similar vehicle that does not put undue stress on the chassis, is stable and easy to use, and allows for quick demounting and reloading of a semitrailer in delivery and transport.

BRIEF SUMMARY OF THE INVENTION

The invention herein provides an efficient, safe and effective method for attaching and detaching a cargo container from a lift frame attached to a vehicle. A driver driving a semitrailer or similar vehicle towing a frame having positioned thereof a cargo container, can lock and unlock the cargo container from the lift frame, and easily position support legs using a unique lift frame assembly as described herein.

In a first embodiment herein, the invention includes a lift frame for a vehicle, comprising: a frame body on a top portion of a frame, the frame body extending from a first end to a second end; a lift mechanism moveable with respect to the first end of the frame body, the lift mechanism comprising: a lift body having a first end and a second end, a lifting surface on the first end of the lift body and the second end of the lift body being positioned so as to be movable with respect to the first end of the frame body, wherein the lifting surface is positioned to engage an underside of a cargo container when placed on an upper side of the frame body; and an inflatable air bag having an upper side and a lower side and mounted on the lower side to a platform positioned on the frame beneath the lift body, wherein the inflatable air bag is connected on the upper side thereof to a mounting surface attached to the lift body; and a source of compressed air in fluid communication with the inflatable air bag.

In one embodiment of the lift frame, the lift body may comprise at least two extending lift arms, each pivotably mounted on the second end of the lift body to the first end of the frame body. The lifting surface may be attached to the first end of the lift body and connected to at least two of the extending lift arms. The lifting surface may also be located on mounting flanges rotatably positioned on a bar extending between two of the at least two extending lift arms, which two extending lift arms may be located on outermost sides of the lift body.

The frame may comprise a longitudinally extending base frame positioned beneath and supporting a lower side of the frame body.

The source of compressed air may comprise a compressor, an electronic control panel for operating the compressor, a pressure gauge and conduit for allowing compressed air to be fed into the lower side of the inflatable air bag.

The lift frame noted above may also comprise a second lift mechanism moveable with respect to the second end of the frame body. The second lift mechanism may comprise: a second lift body having a first end and a second end, a second lifting surface on the second end of the second lift body and the first end of the second lift body being positioned so as to be movable with respect to the second end of the frame body, wherein the second lifting surface is positioned to engage an underside of a cargo container when placed on an upper side of the frame body; and a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and wherein the source of compressed air is also in fluid communication with the second inflatable air bag.

In such an embodiment, the second lift body may comprise at least two extending lift arms, each pivotably mounted on the first end of the second lift body to the second end of the frame body. The second lifting surface may be attached to the second end of the lift body and connected to at least two of the extending lift arms of the second lift body. The second lifting surface may also be located on mounting flanges rotatably positioned on a bar extending between two of the at least two extending lift arms of the second lift body, which two extending lift arms may be located on outermost sides of the second lift body.

The frame body of the lift frame of the first embodiment preferably includes a locking mechanism. The locking mechanism may include a plurality of locking hooks rotatably operable on at least one transversely extending beam interconnected by a longitudinally extending beam, wherein the hooks are actuated by a locking lever positioned on the frame body.

The frame of the lift frame may comprise a longitudinally extending base frame positioned beneath and supporting a lower side of the frame body, wherein a vehicle-side end of the base frame comprises a loading stop for a cargo container when loaded on the frame and a rear end of the base frame is configured for seating a cargo container when loaded on the frame.

In another embodiment herein, the invention may include a lift frame for a vehicle, comprising: a frame body on a top portion of a frame, the frame body extending from a first end to a second end; and further includes a first and a second lift mechanism. The first lift mechanism is moveable with respect to the first end of the frame body, and comprises: a first lift body having a first end and a second end, a first lifting surface on the first end of the first lift body and the second end of the first lift body being positioned so as to be movable with respect to the first end of the frame body, wherein the first lifting surface is positioned to engage an underside of a cargo container when placed on an upper side of the frame body; and a first inflatable air bag having an upper side and a lower side and mounted on the lower side to a first platform positioned on the frame beneath the first lift body, wherein the first inflatable air bag is connected on the upper side thereof to a first mounting surface attached to the first lift body. The second lift mechanism is moveable with respect to the second end of the frame body, and may comprise: a second lift body having a first end and a second end, a second lifting surface on the second end of the second lift body and the first end of the second lift body being positioned so as to be movable with respect to the second end of the frame body, wherein the second lifting surface is positioned to engage an underside of a cargo container when placed on the upper side of the frame body; and a second inflatable air bag having an upper side and a lower side and mounted on the lower side to a second platform positioned on the frame beneath the second lift body, wherein the second inflatable air bag is connected on the upper side thereof to a second mounting surface attached to the second lift body. The lift frame also comprises a source of compressed air in fluid communication with the first and the second inflatable air bags.

In one embodiment of such a lift frame, the first lift body may comprise at least two extending lift arms, each pivotably mounted on the second end of the lift body to the first end of the frame body and the second lift body may comprise at least two extending lift arms, each pivotably mounted on the first end of the second lift body to the second end of the frame body. The first lifting surface may be attached to the first end of the first lift body and connected to at least two of the extending lift arms of the first lift body and wherein the second lifting surface may be attached to the second end of the second lift body and connected to at least two of the extending lift arms of the second lift body. The first lifting surface may also be located on mounting flanges rotatably positioned on a bar extending between two of the at least two extending lift arms of the first lift body, which two extending lift arms may be located on outermost sides of the first lift body, and wherein the second lifting surface may be located on mounting flanges rotatably positioned on a bar extending between two of the at least two extending lift arms of the second lift body, which two extending lift arms may be located on outermost sides of the second lift body.

The lift frame of this embodiment may comprise a longitudinally extending base frame positioned beneath and supporting a lower side of the frame body. The lift frame may also comprise a source of compressed air that includes a compressor, an electronic control panel for operating the compressor, a pressure gauge and conduit for allowing compressed air to be fed into the lower side of the inflatable air bag.

In such embodiment, the frame body preferably also includes a locking mechanism. The locking mechanism may include a plurality of locking hooks rotatably operable on at least one transversely extending beam interconnected by a longitudinally extending beam, wherein the hooks are actuated by a locking lever positioned on the frame body.

The frame may comprise a longitudinally extending base frame positioned beneath and supporting a lower side of the frame body, wherein a vehicle-side end of the base frame comprises a loading stop for a cargo container when loaded on the frame and a rear end of the base frame is configured for seating a cargo container when loaded on the frame.

Also within the invention is a vehicle cargo container and lift frame assembly, comprising: a frame body on a top portion of a frame, the frame body extending from a first end to a second end; a cargo container configured to be removably seated on the frame so as to cover the frame body; a lift mechanism moveable with respect to the first end of the frame body, wherein the lift mechanism comprises: a lift body having a first end and a second end, a lifting surface on the first end of the lift body and the second end of the lift body being positioned so as to be movable with respect to the first end of the frame body, wherein the lifting surface is positioned to engage an underside of the cargo container when placed on an upper side of the frame body; and an inflatable air bag having an upper side and a lower side and mounted on the lower side to a platform positioned on the frame beneath the lift body, wherein the inflatable air bag is connected on the upper side thereof to a mounting surface attached to the lift body; and a source of compressed air in fluid communication with the inflatable air bag.

In this embodiment of the assembly, the lift body may comprise at least two extending lift arms, each pivotally mounted on the second end of the lift body to the first end of the frame body. The lifting surface may attached to the first end of the lift body and connected to at least two of the extending lift arms. The lifting surface may also be located on mounting flanges rotatably positioned on a bar extending between two of the at least two extending lift arms, which two extending lift arms are located on outermost sides of the lift body.

In the assembly, the frame may comprise a longitudinally extending base frame positioned beneath and supporting a lower side of the frame body.

Also in the assembly, the source of compressed air may comprise a compressor, an electronic control panel for operating the compressor, a pressure gauge and conduit for allowing compressed air to be fed into the lower side of the inflatable air bag.

The assembly may also include a second lift mechanism moveable with respect to the second end of the frame body, the second lift mechanism may comprise: a second lift body having a first end and a second end, a second lifting surface on the second end of the second lift body and the first end of the second lift body being positioned so as to be movable with respect to the second end of the frame body, wherein the second lifting surface is positioned to engage an underside of the cargo container when placed on the upper side of the frame body; and a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and wherein the source of compressed air is also in fluid communication with the second inflatable air bag.

In such embodiment of the assembly, the second lift body may comprise at least two extending lift arms, each pivotably mounted on the first end of the second lift body to the second end of the frame body. The second lifting surface may be attached to the second end of the second lift body and connected to at least two of the extending lift arms of the second lift body. The second lifting surface may also be located on mounting flanges rotatably positioned on a bar extending between two of the at least two extending lift arms of the second lift body, which two extending lift arms may be located on outermost sides of the second lift body.

The assembly may also include a locking mechanism on the frame body. The locking mechanism may include a plurality of locking hooks rotatably operable on at least one transversely extending beam interconnected by a longitudinally extending beam, wherein the hooks are actuated by a locking lever positioned on the frame body.

The frame of the assembly may comprise a longitudinally extending base frame positioned beneath and supporting a lower side of the frame body, wherein a vehicle-side end of the base frame comprises a loading stop for the cargo container when positioned on the frame and a rear end of the base frame is configured for seating the cargo container when positioned on the frame.

In an embodiment of the assembly, the cargo container may comprise a base that defines a plurality of recesses configured for receiving support legs, and the assembly may further comprise retractable support legs pivotally attached to the base of the cargo container. The support legs may be adjustable and may comprise a hinge on one end thereof for pivotal movement. The assembly may also further comprise a lock warning light for placement in a cab of a truck.

The invention further includes a method of loading a cargo container on a lift frame of a vehicle to create a vehicle cargo container and lift frame assembly attached to a vehicle, comprising: (a) attaching a lift frame to a rear of a vehicle, wherein the lift frame comprises a frame body on a top portion of a frame, the frame body extending from a first end to a second end; a lift mechanism moveable with respect to the first end of the frame body, the lift mechanism comprising: a lift body having a first end and a second end, a lifting surface on the first end of the lift body and the second end of the lift body being positioned so as to be movable with respect to the first end of the frame body, wherein the lifting surface is positioned to engage an underside of the cargo container when placed on an upper side of the frame body; and an inflatable air bag having an upper side and a lower side and mounted on the lower side to a platform positioned on the frame beneath the lift body, wherein the inflatable air bag is connected on the upper side thereof to a mounting surface attached to the lift body; and a source of compressed air in fluid communication with the inflatable air bag; (b) backing the vehicle and the attached lift frame under the cargo container, wherein the cargo container is supported on a plurality of support legs, and the cargo container having a first end and a second end; (c) inflating the inflatable air bag using the source of compressed air to lift the first end of the cargo container such that an underside of the cargo container contacts the lifting surface; (d) removing the support legs; (e) deflating the inflatable air bag using the source of compressed air; and (f) locking the cargo container to the frame body.

In one embodiment of the method of loading a cargo container, the cargo container may comprises a base having recesses therein, and the step of removing the support legs may comprise lifting the support legs and stowing them in the recesses in the base of the cargo container.

In another embodiment of the method of loading a cargo container, the lift frame may further comprise a second lift mechanism moveable with respect to the second end of the frame body. The second lift mechanism may comprise: a second lift body having a first end and a second end, a second lifting surface on the second end of the second lift body and the first end of the second lift body being positioned so as to be movable with respect to the second end of the frame body, wherein the second lifting surface may be positioned to engage the underside of the cargo container when placed on the upper side of the frame body; and a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and the source of compressed air is also in fluid communication with the second inflatable air bag. In such embodiment, the method may further comprise after step (b) and before step (f), (g) inflating the second inflatable air bag using the source of compressed air to lift the second end of the cargo container such that the underside of the cargo container contacts the second lifting surface; and (h) deflating the second inflatable air bag using the source of compressed air.

In this embodiment of the method of loading a cargo container the first and the second inflatable air bags may be inflated in steps (c) and (g) simultaneously. In addition, in one embodiment of the method of loading a cargo container, the first and the second inflatable air bags may be deflated in steps (e) and (h) simultaneously. Further, in another embodiment, the first and the second inflatable air bags may be simultaneously inflated in steps (c) and (g) and simultaneously deflated in steps (e) and (h).

In the method of loading a cargo container, the cargo container may comprise a base having a plurality of recesses therein for receiving the plurality of support legs, and removing the support legs may comprise lifting the support legs located on the first end of the cargo container and stowing them in the recesses located in the base at the first end of the cargo container when the first inflatable bag is inflated, and lifting the support legs located on the second end of the cargo container and stowing them in the recesses located in the base at the second end of the cargo container when the second inflatable bag is inflated.

The invention may also include in yet a further embodiment, a method of unloading a cargo container from a lift frame of a vehicle cargo container and lift frame assembly so as to detach the vehicle cargo container from the lift frame, comprising: (a) unlocking the cargo container from a frame body of the lift frame, the frame body positioned on a top portion of a frame, wherein the frame body extends from a first end to a second end, and the cargo container has a first end and a second end; (b) inflating an inflatable air bag using a source of compressed air in fluid communication with the inflatable air bag to lift the first end of the cargo container off the frame, wherein the lift frame comprises the frame and the frame body; a lift mechanism moveable with respect to the first end of the frame body, the lift mechanism comprising: a lift body having a first end and a second end, a lifting surface on the first end of the lift body and the second end of the lift body being positioned so as to be movable with respect to the first end of the frame body, wherein the lifting surface is positioned to engage an underside of the cargo container positioned on an upper side of the frame body and wherein when the first end of the cargo container is lifted it contacts the lifting surface; and the inflatable air bag having an upper side and a lower side and mounted on the lower side to a platform positioned on the frame beneath the lift body, wherein the inflatable air bag is connected on the upper side thereof to a mounting surface attached to the lift body; (c) positioning a plurality of support legs of the cargo container in a support position; (d) deflating the inflatable air bag using the source of compressed air; and (e) driving the vehicle attached to the frame away from the cargo container in the support position.

In one embodiment of the method of unloading a cargo container from a lift frame, the plurality of support legs may be positioned in the support position by removing the support legs from recesses in a base of the cargo container and adjustably moving them into the support position.

In another embodiment of the method of unloading a cargo container from a lift frame, the lift frame may further comprise a second lift mechanism moveable with respect to the second end of the frame body. The second lift mechanism may comprise: a second lift body having a first end and a second end, a second lifting surface on the second end of the second lift body and the first end of the second lift body being positioned so as to be movable with respect to the second end of the frame body, wherein the second lifting surface is positioned to engage the underside of the cargo container positioned on the upper side of the frame body; and a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and the source of compressed air is also in fluid communication with the second inflatable air bag. In such an embodiment, the method may further comprise after step (a) and before step (e), (f) inflating the second inflatable air bag using the source of compressed air to lift the second end of the cargo container such that the underside of the cargo container contacts the second lifting surface; and (g) deflating the second inflatable air bag using the source of compressed air.

In such an embodiment of the method of unloading a cargo container, the plurality of support legs may be positioned in the support position by first moving the support legs from first recesses in a base of the cargo container located at the first end of the cargo container and adjustably moving the support legs from the first recesses into the support position while the first inflatable air bag is inflated and then moving the support legs from second recesses in the base of the cargo container located at the second end of the cargo container and adjustably moving the support legs from the second recesses into the support position while the second inflatable air bag is inflated.

Also in an embodiment of the method of unloading a cargo container from a lift frame, the first and the second inflatable air bags may be simultaneously inflated during steps (b) and (f). The first and the second inflatable air bags may be simultaneously deflated during steps (d) and (g) in the method. Further the first and the second inflatable air bags may be simultaneously inflated during steps (b) and (f) and simultaneously deflated during steps (d) and (g).

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 17 is an enlarged view of a safety lock warning light and alarm panel for use with the locking mechanism and lift frame hereof for mounting.

DETAILED DESCRIPTION OF THE INVENTION

Figure 1:
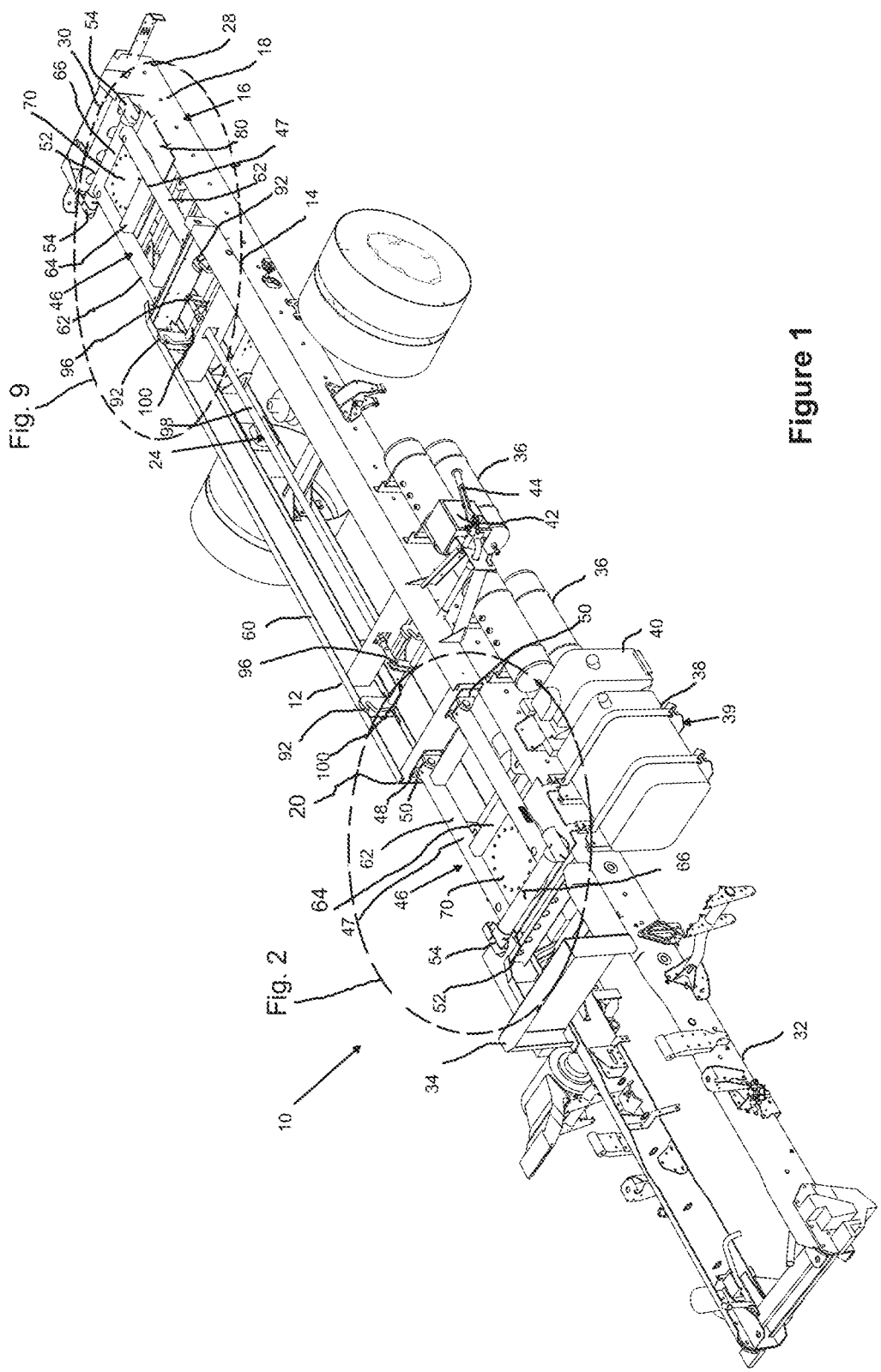
FIG. 1 is a top perspective view of one embodiment of a lift frame according to the invention wherein the lift frame includes two lift mechanism(s) which are both in a deflated position.
Figure 2:
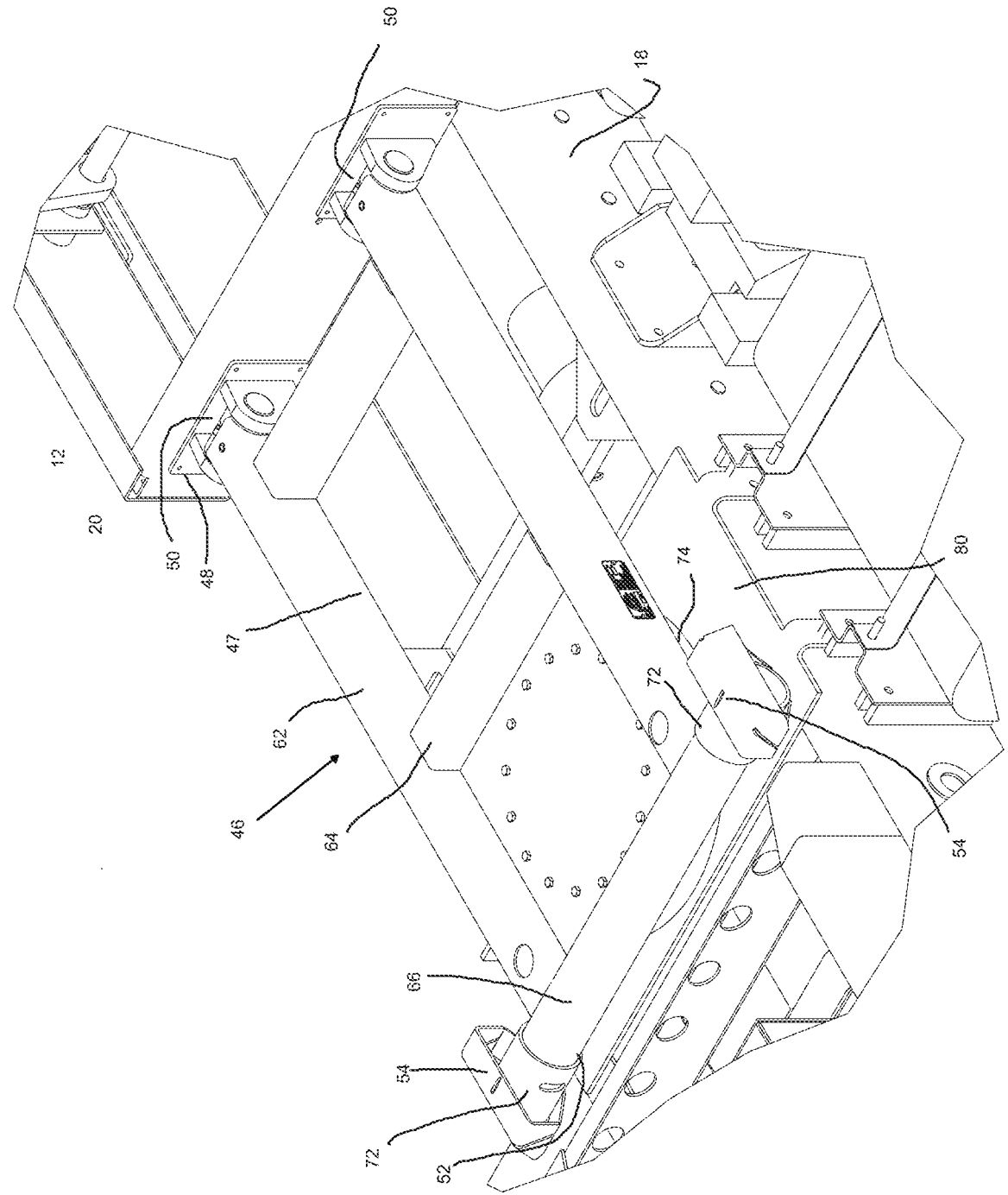
FIG. 2 is an enlarged view of a lift mechanism positioned near the front (truck-side) of the lift frame of FIG. 1 wherein the lift mechanism is deflated.
Figure 3:
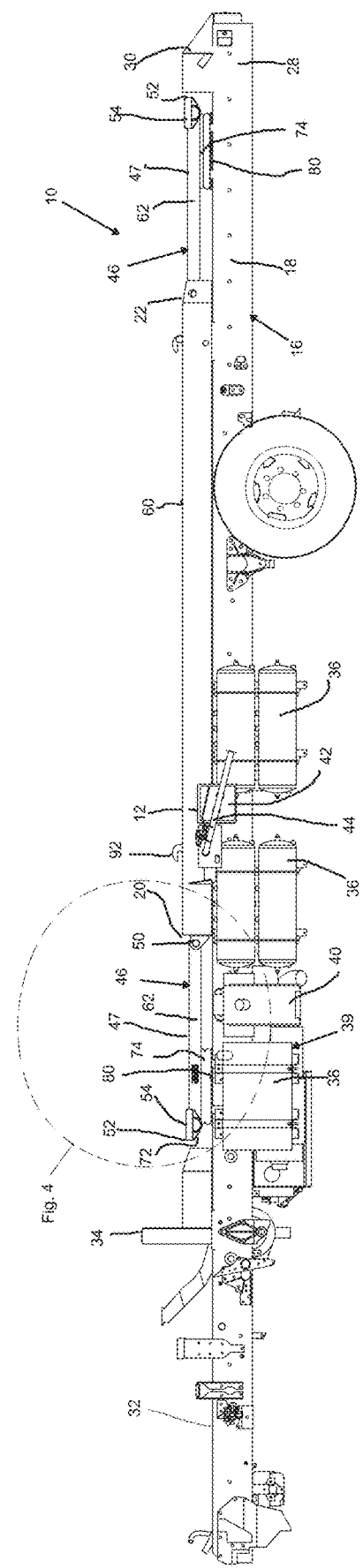
FIG. 3 is a side elevational view of the lift frame of FIG. 1.

A lift frame is provided herein which may be used with various vehicles. The lift frame may receive a cargo load of varying types including those included in standard cargo containers such as standard-sized container boxes, specialty cargo containers or boxes, direct cargo intended to sit on a frame, base or trailer thereof, another vehicle or another trailer being towed behind a first trailer (double trailer), or other types of semitrailer loads, as well as twin trailers (which may be configured to have a twin lift frame or to have one of the trailers include a lift frame as described herein). As used herein, and as will be understood by one skilled in the art reading this disclosure, a "cargo container," may include any of the above which may benefit from a lift frame as described herein to support and assist loading and unloading cargo from a trailer frame, wherein the cargo container is intended to or could benefit from being detached from a trailer frame.

As used herein, words such as "upper" and "lower," "inner" and "outer," "top" and "bottom," "upperside" and "underside," and words of similar import are intended to assist one of skill in the art in reading the disclosure and understanding the invention with reference to the drawings and are not generally intended to be limiting to the scope of the invention.

Further, in the Summary hereof reference is made to "first" and "second" ends and sides of various components such as the frame body, lift mechanism, cargo container and other corresponding parts. It should be understood by one skilled in the art based on this disclosure that such "first" and "second" parts are intended to be consistent with each other in terms of position and to be distinct from one another but to be interpreted to refer to both a front to rear or rear to front configuration in order to cover variations in embodiments within the scope of the invention. That is, the "first end" may be used to indicate the vehicle-side or the rear-side (side away from the vehicle-side) of the frame body, lift mechanism, cargo container or other corresponding parts. When the "first end" is viewed as one of these sides, the "second end" would be the opposite end of the first end.

Thus, the embodiments described in the Summary may be interpreted such that the lift frame may be operated using only one lift mechanism on a lift frame which lift frame may have one or two lift mechanisms available on the lift frame. Thus, one could operate only one lift mechanism positioned on either end of a lift frame (vehicle end or rear end) having only one lift mechanism. Alternatively, one could provide the lift frame with two lift mechanisms (as shown in the preferred embodiment of the Figures herein), and both lift mechanisms may be used and operated independently (and sequentially, vehicle-side first followed by rear side second or rear side first followed by vehicle side second), or used and operated simultaneously. It is also possible that two such lift mechanisms are provided, but only one is actually operated and not the other. Thus, "first" and "second" in the Summary while intending to refer to opposite ends or sides and to be used consistently in that regard with other similarly denominated parts in an embodiment, but are not intended to refer always to a specific directional end (front/vehicle-side end or rear end) unless specifically identified as such, and showing or referencing two lift mechanisms should not be considered to limit the invention to requiring two such mechanisms absent an express recitation thereof.

For convenience and to thoroughly explain the invention hereof, the following description will be set forth with respect to an embodiment having two lift mechanisms, a front or vehicle-side lift mechanism and a rear lift mechanism. In the embodiment of the lift frame, assembly and methods herein the operation of the lift frame will be described as having both lift mechanisms operational and operating sequentially, however, one of the two may be omitted or the mechanisms operated simultaneously or in an opposite manner to that described without departing from the scope of the invention herein.

According to one embodiment, herein, a lift frame is described for use in supporting a cargo container. The lift frame will be described initially with reference to FIGS. 1-19. FIG. 1 shows a perspective view of a lift frame, generally referred to herein as lift frame 10. The lift frame 10 includes a frame body 12 situated on a top portion 14 of a frame 16. The frame 16 also includes a base frame 18 below the frame body 12 of the lift frame 10. The frame body 12 extends between a vehicle side end 20 to a rearward end 22 (which could be viewed as a first and a second end, or a second and first ends, respectively). The frame body 12 is shown as having a rectangular configuration having steam beam sides and enclosing a preferred embodiment of an optional locking mechanism 24 described further below.

The base frame 18 provides the trailer base of the lift frame 10 and lies beneath and supports both the lower side 26 of the frame body 10 and associated lift mechanism(s). The base frame 18 extends longitudinally (as preferably does the frame body) and has at a rear end 28 of the base frame 18 a section 30 that is configured to seat a cargo container when loaded on the frame 16. A vehicle-side end 32 of the base frame 18 is configured to have various typical and conventional connecting components as are known in the art to connect a trailer or semitrailer in particular to a vehicle for towing (for example to connect to a fifth wheel coupling). The vehicle-side end 32 may also include a loading stop 34 element for receiving a cargo container when loaded and/or otherwise positioned on the frame 16.

The base frame 18 may also support various truck control elements 40, air supply units 36, a compressor 38 and any other desired or associated electronic components (electrical truck connections and the like). The frame body 12 may include a mount for the controls 42 for the lift mechanism(s) for inflating and deflating such mechanism(s). It may also include a locking lever 44 (or a similar device) for use with a locking mechanism as described below.

The lift frame 10 includes one or two lift mechanism(s) 46. Each lift mechanism 46 includes preferably identical parts, although if desired, it will be understood by one skilled in the art based on this disclosure that the designs may be varied for individual preferences such as to take account in variations in load or the shape and/or size of the load provided by the cargo container. For the purpose of describing a preferred embodiment shown in the drawings, there are two lift mechanisms 46, one positioned near the vehicle-side end 32 of the base frame 16 and one positioned near the rear end 28 of the base frame 16. Each has the same components but is positioned to generally extend in opposite directions, with each moveably mounted on an opposite end of the frame body and extending outwardly from the frame body to a free support end. Thus, each of the lift mechanisms lifts in an upward direction on its free support end while its base frame end remains moveably mounted to the frame body.

With reference to FIGS. 1-6, one lift mechanism is described with reference to a vehicle-side lift mechanism 46. The lift mechanism 46 has a lift body 47 which extends from a frame body end 48 where it is moveably mounted. As shown herein, the lift body 47 is mounted using a reinforced pin-mounted hinge 50 allowing it to move upwardly from the frame so as to be moveable with respect to a vehicle-side end 20 of the frame body 12. While two pin-mounted hinges 50 are shown, other devices allowing for movement up and down in a preferably pivotable manner may be used, such as sliding hinges, ball and socket hinges, a single, long hinge extending across the frame body end, pneumatic or hydraulic-assisted lift rotatable hinges, and the like. Opposite the frame body end 48 is a support lifting end 52 of the lift body 47. The support lifting end 52 has lifting surface 54. The lifting surface 54 is positioned to engage an underside 56 of a cargo container 58 when placed on an upper side 60 of the frame body 12 as shown, for example, in assembly FIG. 14.

Figure 4:
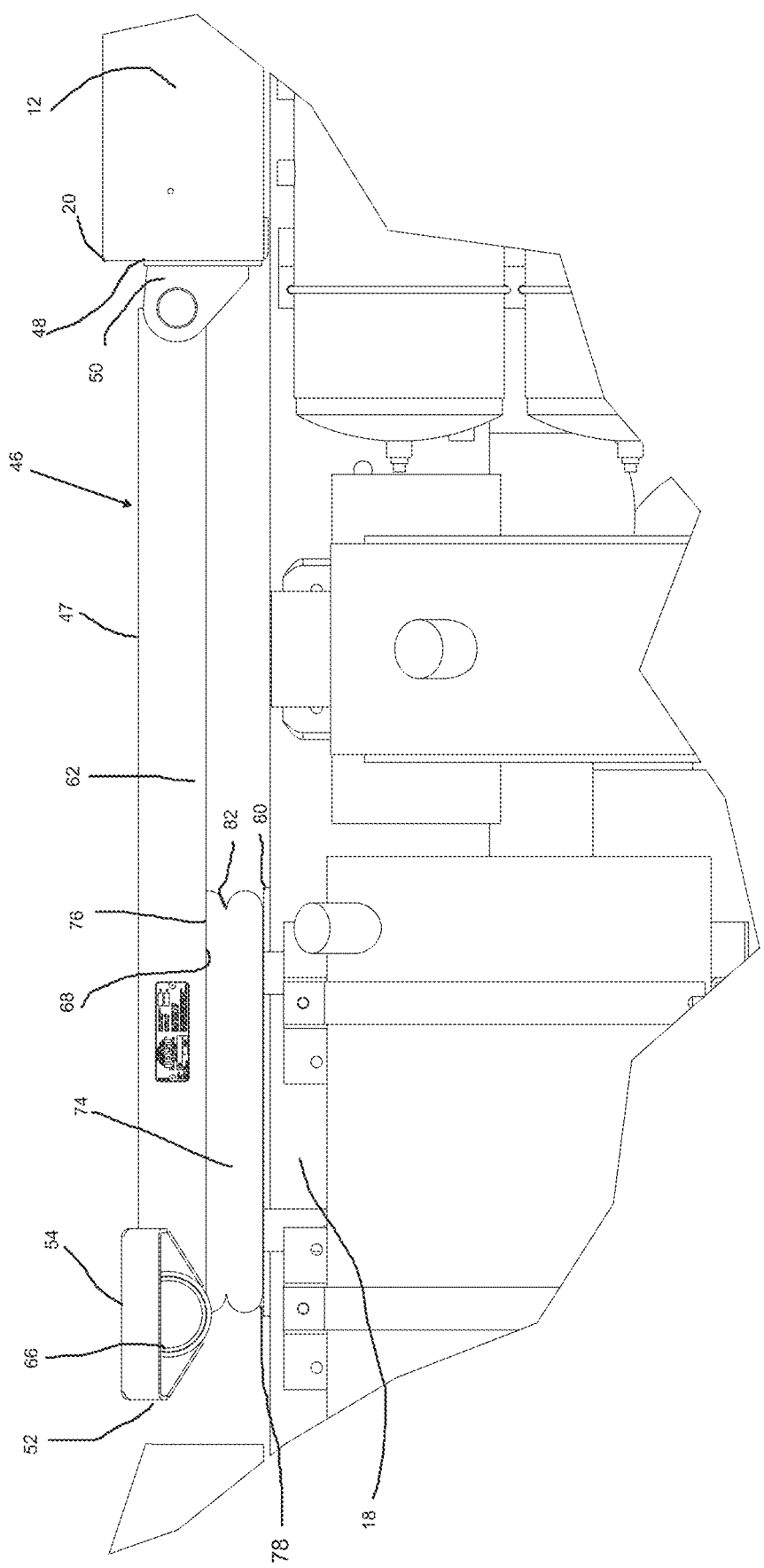
FIG. 4 is an enlarged side elevational view of a portion of the lift mechanism of the lift frame of FIGS. 1 and 3.
Figure 8:
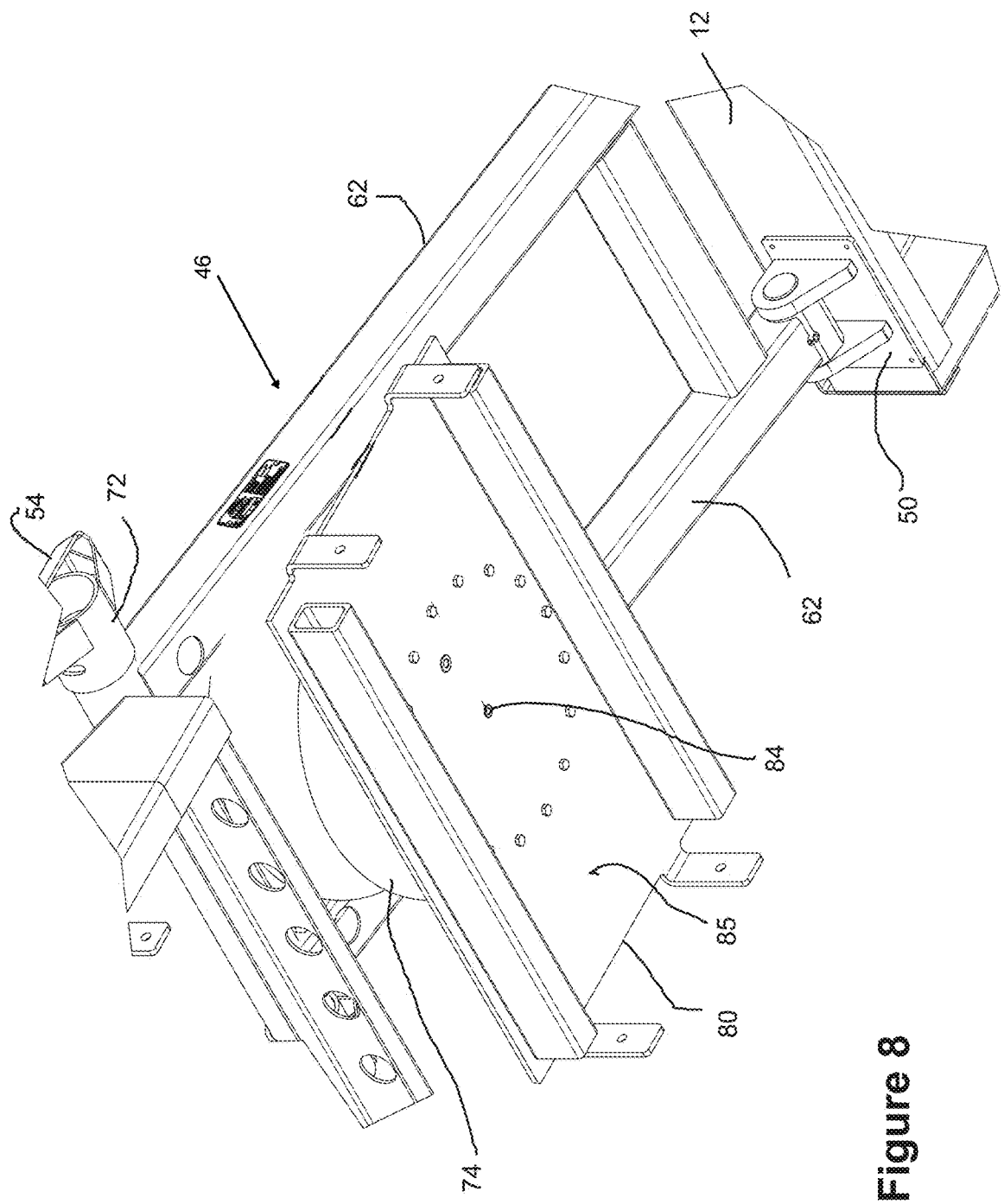
FIG. 8 is an enlarged view of a portion of FIG. 7 showing an air inlet to the inflatable air bag of one of the lift mechanism(s) of FIG. 7 near the front (truck-side) end of the lift frame.
Figure 9:
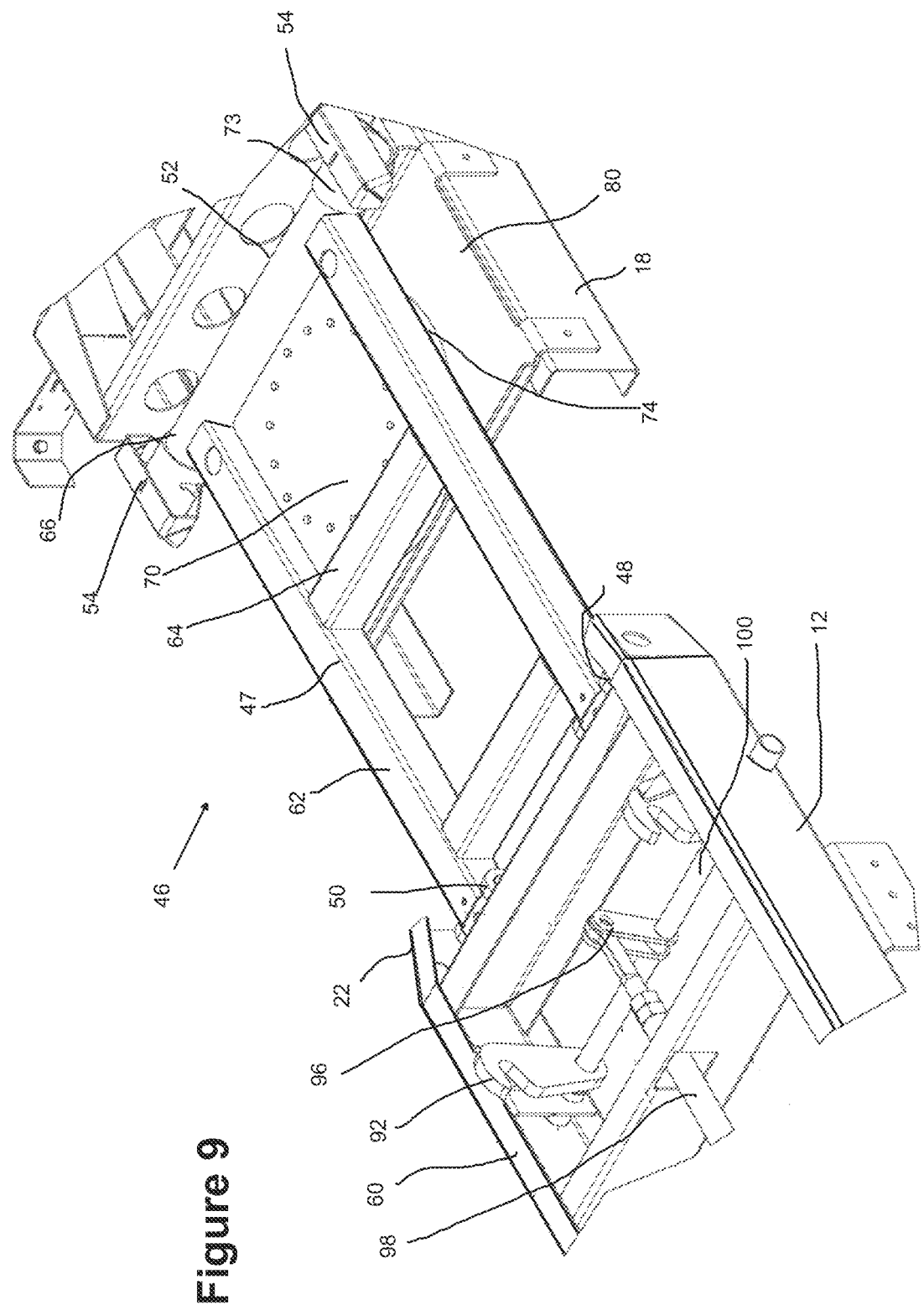
FIG. 9 is an enlarged view of a portion of the lift frame of FIG. 1 wherein the lift mechanism is positioned near the back (rear-side) of the lift frame of FIG. 1 (i.e., away from the truck side of the frame) with the lift mechanism deflated.

The lift body may be configured in various ways provided it can carry out the functions described herein. As shown, a lift body 47 is constructed using two extending lift arms 62 extending from the frame body end 48 longitudinally toward a supporting lifting end 52 which for this lift body 47 is positioned near the vehicle-side end of the frame 16, however, multiple support arms could be provided between the two outermost extending lift arms 62 as shown. At the frame body end 48 of the lift body, each of the extending lift arms 62 is preferably pivotably mounted on the vehicle-side end 20 of the frame body 12 using hinges 50. A further support bar 64 is provided extending transversely between the extending lift arms 62. At the support lifting end 52 of the lift body (in this instance positioned on the vehicle-side end of the frame), a further transverse end support bar 66 is mounted at the end of the extending arms 62 forming an area between the traverse bar 64, the extending lift arms 62 and the transverse end support bar 66 which area is used to secure a mounting surface 68 for an inflatable air bag as described below. The mounting surface 68 may be on the bottom of a plate 70 as best shown in FIGS. 1, 4 and 8.

In the embodiment as shown in FIGS. 1-6, the lifting surface 54 is positioned on top of two flanges 72 which are rotatably positioned on the transverse end support bar 66, one on each transverse end thereof. Such flanges 72 can rotate while the lift body 47 moves upwardly while laying planar with respect to an underside 56 of a cargo container 58 when contacting the lifting surface. The lifting surface 54 could alternatively extend as a single rotatable piece along the entire transverse end support bar 66, or a design could be configured wherein the transverse end support bar is molded or otherwise formed to have a transversely extending lifting surface. Preferably, the lifting surface 54 is attached to the support lifting end 52 of the lift body shown near the vehicle-side end of the frame or generally on the side of the lift body opposite that which is moveably positioned with respect to the frame body.

The lift body and associated parts are preferably formed of a metal or metal alloy or reinforced composite having sufficient strength to withstand a maximum cargo container load for which the frame is intended to hold in use. Locking hooks, lift surfaces and other structural support parts are preferably formed of stainless steel which may be galvanized. Materials should be selected based on load requirements and applicable vehicle government and industry requirements. The lifting surface 54, such as flanges 72 may be formed of similar materials but are preferably include a material having wear resistance and some impact capability and a suitable physical properties to resist wear and impact damage from repeated use and loading.

The lift mechanism 46 also includes an inflatable air bag 74 having an upper side 76 and a lower side 78. The inflatable air bag 74 is mounted on its lower side 78 to a platform 80 positioned on the frame 16, preferably on the base frame 18, beneath the lift body 47. The inflatable air bag 74 may be formed from a flexible material of sufficient strength to hold air pressure and support the cargo container load applied to the air bag. Reinforced or high strength elastomers or flexible composites may be used to form the air bag. As shown, the air bag is compressed in at least one area 82 in a bellows-like manner to assist in compression when deflated.

Figure 15:
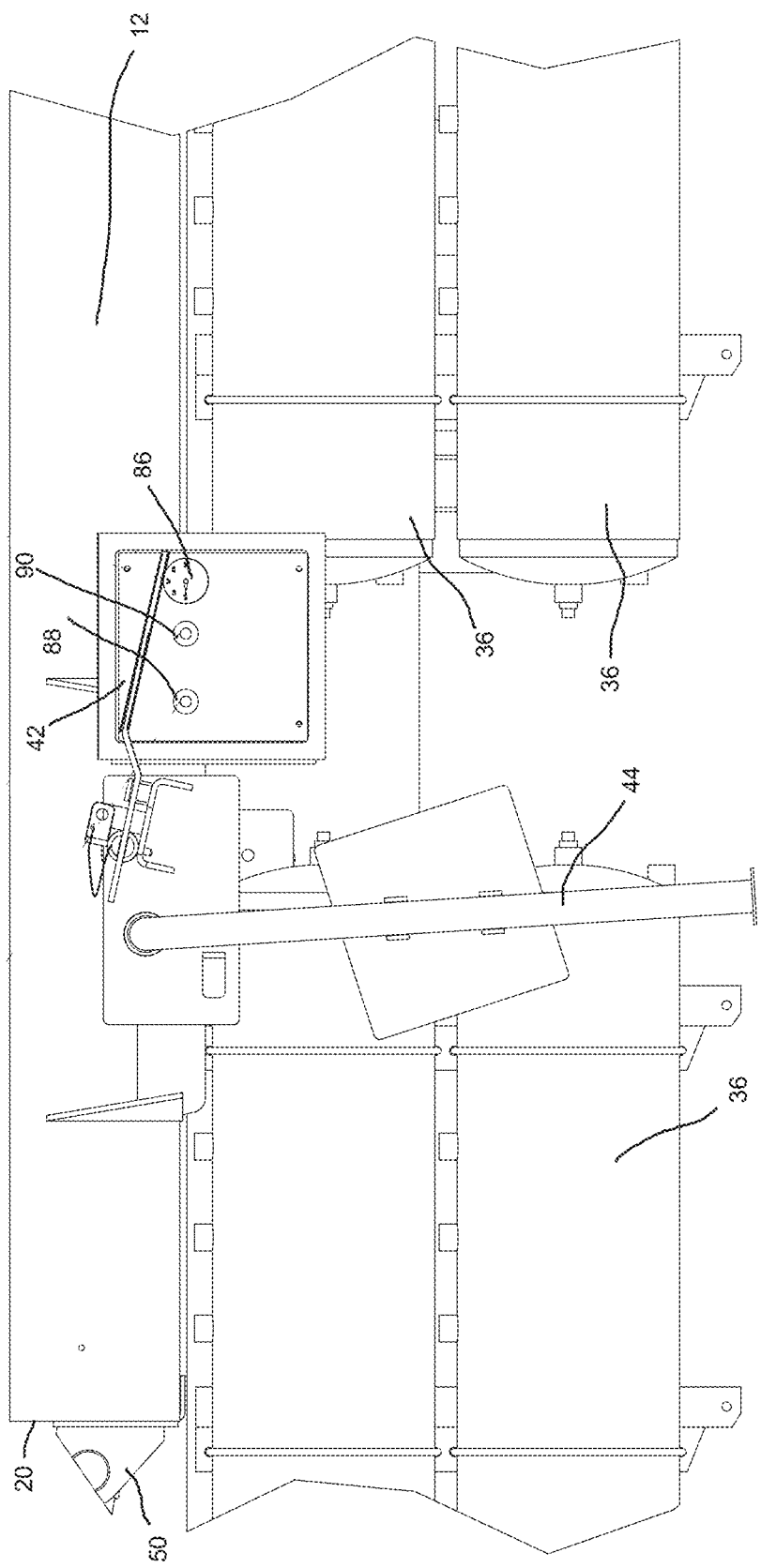
FIG. 15 is a further enlarged portion of the lift frame of FIG. 3 showing details of a locking lift arm for a locking mechanism and controls for the lift frame of FIG. 1.
Figure 16:
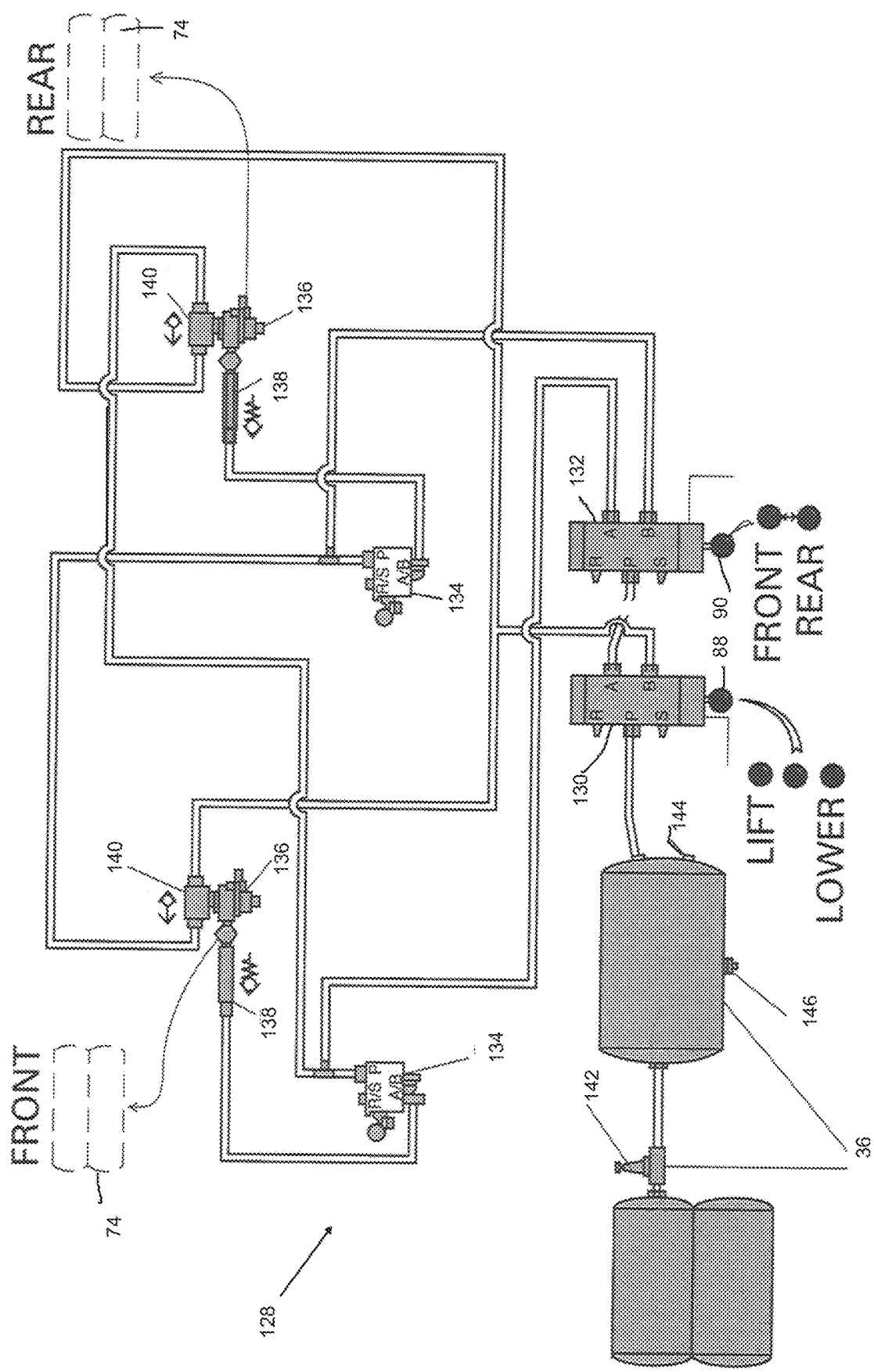
FIG. 16 is a schematic diagram of the air compressor control system for the lift frame of FIG. 1.

The platform 80 is preferably also formed of materials of similar strength to that used in the lift body 47. The upper side 76 of the air bag 74 as noted above is connected to a mounting surface 68 on a plate 70 attached to the lift body. The air bag 74 is inflatable through an air inlet 84 in fluid communication between the air bag 74 and an air compressor 38 having an air source 36. Any suitable compressor may be used and standard air system configuration employed to provide pressure-controlled air to the air bag 74 through the inlet 84 on a lower side 85 of the platform 80. The air compressor 38 and air source 36 together act as a source of compressed (pressurized) air 39 for use in the lift frame. The compressor 38 preferably delivers pressurized air through conduit arranged as in FIG. 16 and using a pressure gauge 86 to monitor the pressure which is controlled using pressure regulated check valves as shown in FIGS. 15-16. On/off toggle switches 88, 90 are provided further to control system box 42 for use in engaging the inflation and deflation control system discussed below for inflating and deflating the air bag 74 shown in FIGS. 1-6 on the vehicle-side end of the lift frame and the other air bag 74 shown on the other lift mechanism 46 on the rear end side of the lift frame 10, which has the same construction but is oriented to lift in the opposite direction as shown. Note that while toggle switches are shown, other control switches, buttons or other activation mechanisms may be used.

With reference to the lift mechanism 46 shown in FIGS. 1, 3, 5 and 9 (as well as in the vehicle loading Figures) that is positioned on the rear end side of the lift frame 10, that lift mechanism 46 is also moveable with respect to an end the frame body, but the lift body 47 thereof is moveable with respect to the rear end 22 of the frame body 12. The lift body 47 extends from a frame body end 48 where it is moveably mounted. The lift body 47 is preferably mounted as described above, and is shown using reinforced pin-mounted hinges 50 allowing it to move upwardly from the frame so as to be moveable with respect to the rear end 22 of the frame body 12. Opposite the frame body end 48 is a support lifting end 52 of the lift body 47 near the rear end of the frame 16. The support lifting end 52 has lifting surface 54. The lifting surface 54 is positioned to engage an underside 56 of a cargo container 58 when placed on an upper side 60 of the frame body 12 as shown, in assembly FIG. 14.

As noted above with respect to the lift body 47 on the vehicle-side end of the frame 16, the a lift body 47 on the rear end side of the frame 16 is preferably also constructed using two extending lift arms 62 extending from the frame body end 48 of the lift body 47 longitudinally toward the support lifting end 52 which in this lifting body is near the rear end side of the frame 16, however, multiple support arms could be provided between the two outermost extending lift arms 62 shown. At the frame body end 48 of the lift body 47, each of the extending lift arms 62 is preferably pivotably mounted on the end 22 of the frame body 12 using hinges 50 as described above. A further support bar 64 may also be provided as with the other lift body described above and extends transversely between the extending lift arms 62. At the support lifting end 52 of the lift body 47, a further transverse end support bar 66 may be mounted at the end of the extending arms 62 forming an area between the traverse bar 64, the extending lift arms 62 and the transverse end support bar 66 which area is used to secure a mounting surface 68 for a further inflatable air bag. The mounting surface 68 may be on the bottom of a plate 70 as in the same manner shown with respect to the vehicle-side lift mechanism as described above.

The lifting surface 54 may be positioned on top of two flanges 72 also described above which are each rotatably positioned on the transverse end support bar 66, one on each transverse end thereof. Preferably, the lifting surface 54 is attached to the support lifting end 52 of the lift body shown or generally on the side of the lift body opposite that which is moveably positioned with respect to the frame body.

The lift mechanism 46 on the rear end of the frame 16 also includes an inflatable air bag 74 having an upper side 76 and a lower side 78. The inflatable air bag 74 is mounted on its lower side 78 to a platform 80 positioned on the frame 16, preferably on the base frame 18, beneath the lift body 47. The inflatable air bag 74 may be as described above. As shown, the air bag is compressed in at least one area 82 in a bellows-like manner to assist in compression when deflated.

The upper side 76 of the air bag 74 as noted above is connected to a mounting surface 68 on a plate 70 attached to the lift body. The air bag 74 is inflatable through its own air inlet 84 like the vehicle-side lift mechanism described above that is in fluid communication between the air bag 74 and the same air compressor 38 and sharing the same compressed air source 36. The compressor 38 preferably also delivers pressurized air through conduit arranged as in FIG. 16 and using a pressure gauge 86 to the air bag 74 on the rear end of the frame to monitor the pressure which is controlled using pressure regulated check valves as shown in FIGS. 15-16.

Figure 5:
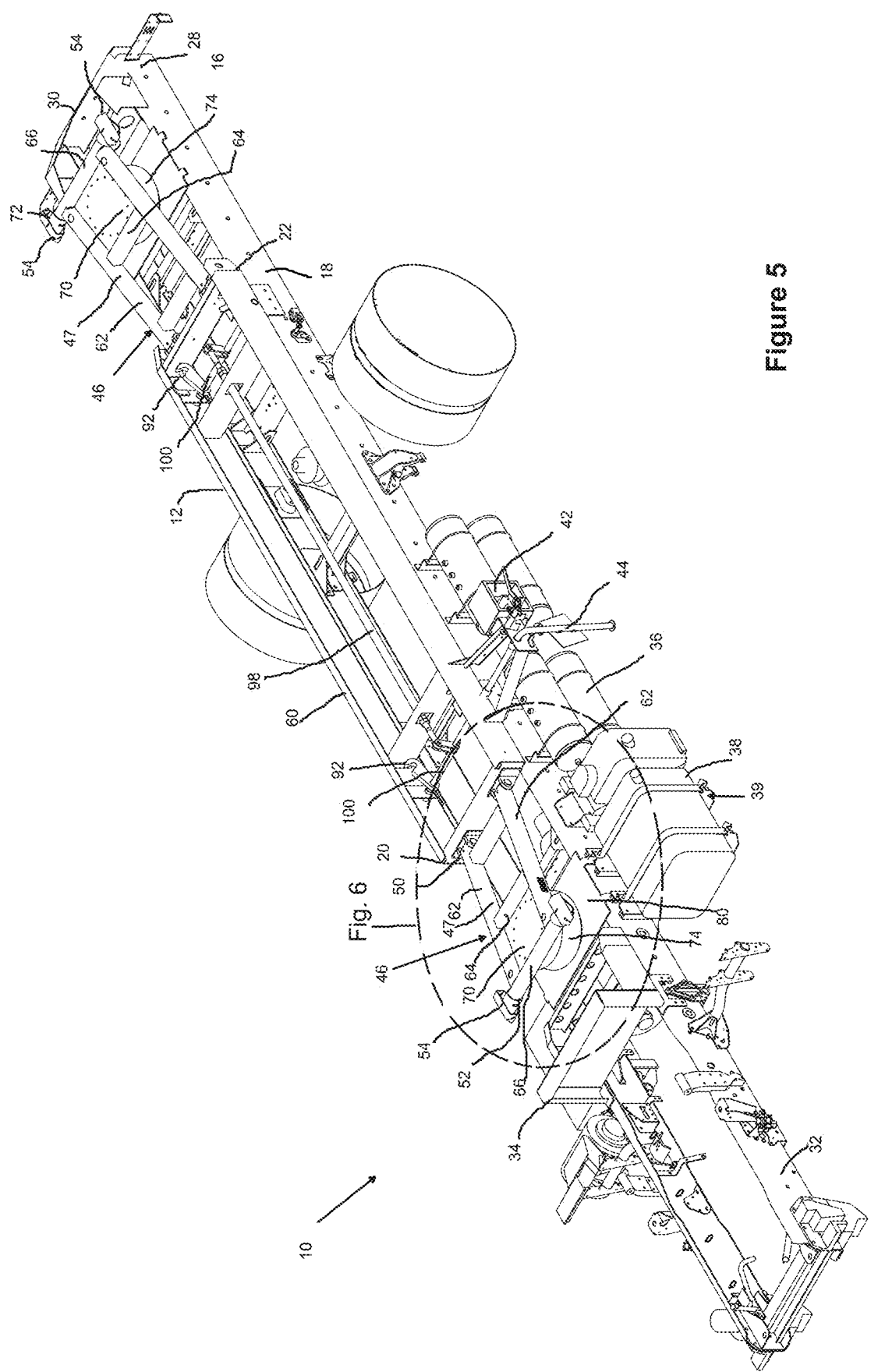
FIG. 5 is a top perspective view of the lift frame of FIG. 1 with both lift mechanism(s) inflated.
Figure 6:
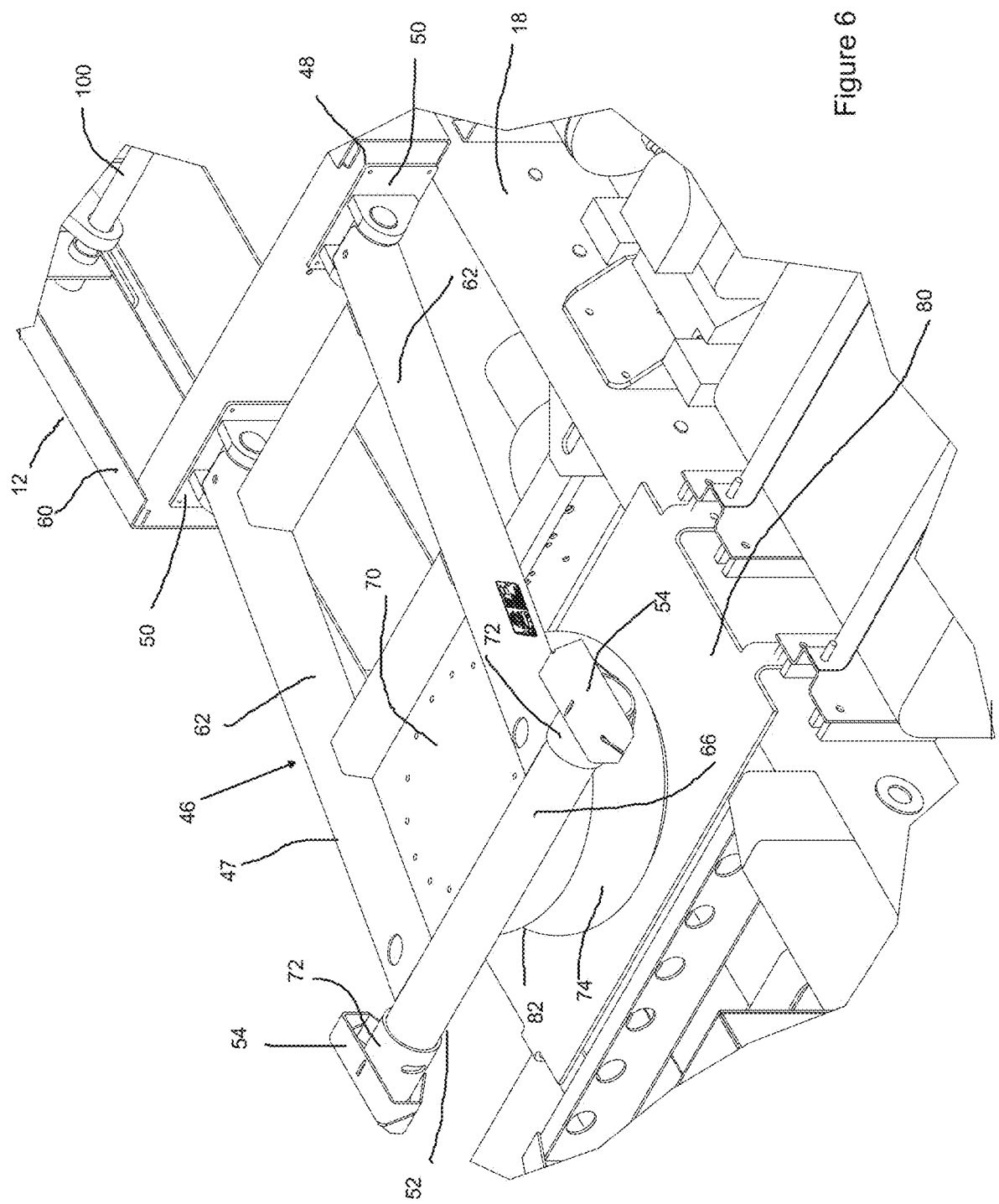
FIG. 6 is an enlarged view of a lift mechanism positioned near the front (truck-side) of the lift frame of FIG. 5 with the lift mechanism inflated.
Figure 7:
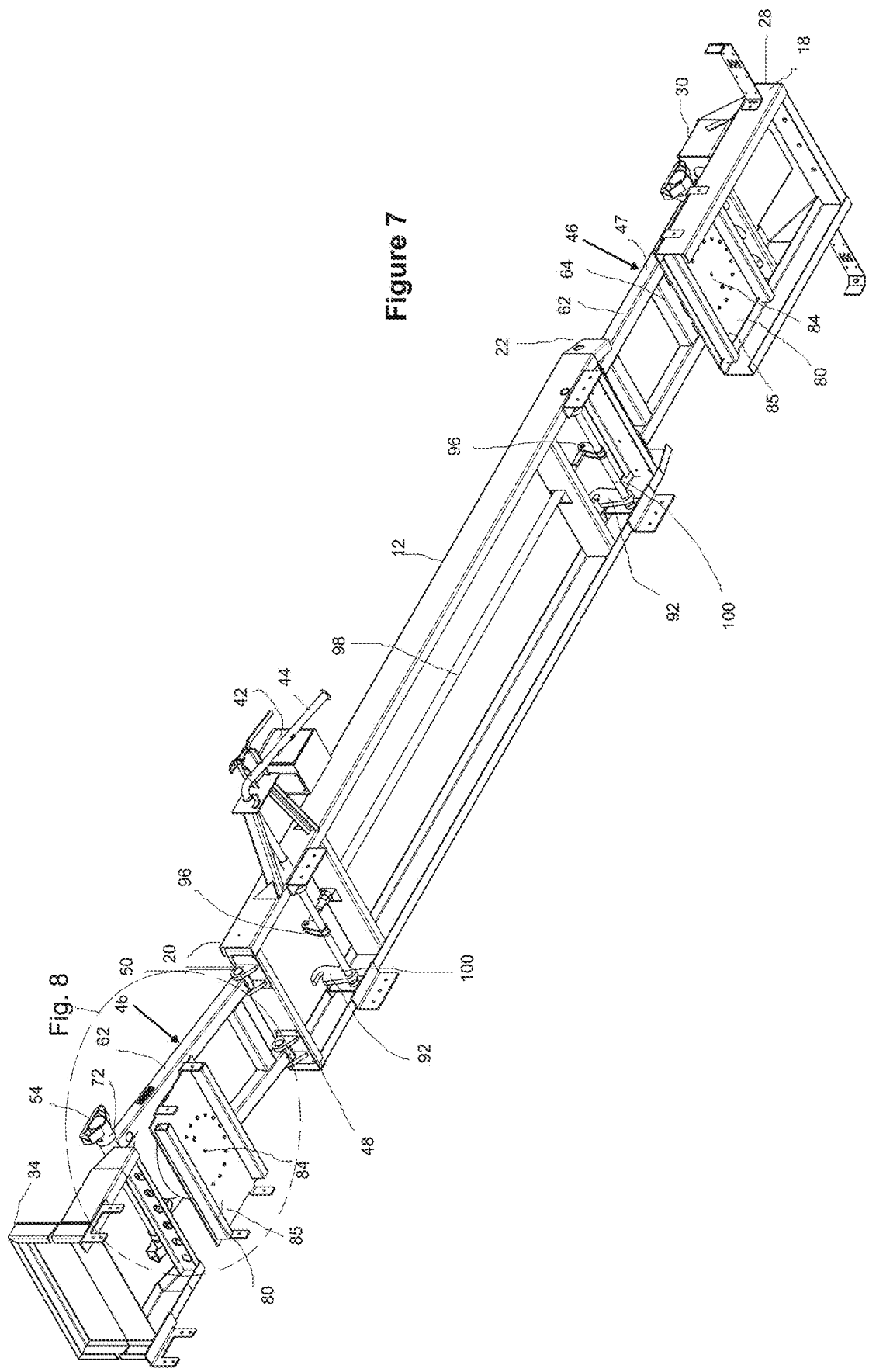
FIG. 7 is a partial bottom perspective view of the lift frame of FIG. 1 with attachments removed and both lift mechanism(s) inflated.

The locking mechanism 24 for the lift frame 10 is preferably located on the frame body 12. As shown, it has a plurality of locking hooks 92 which are rotatably operable so as to move up into a locking position and down into an unlocked position. In the locking position, the locking hooks 92 may engage a base 94 of a cargo container 58. On an underside 56 of the cargo container 58, frame structures (not shown) or other suitable structures such as bars may be provided for receiving the locking hooks 92. FIG. 1 shows the locking hooks 92 upright and in a locked position while the air bag(s) 74 are deflated. The locking lever 44 is pulled up in a locked position. This is the position the lift frame locking device and air bags would be in when a cargo container is positioned on the lift frame and locked to the lift frame. FIG. 5 shows the locking hooks 92 in a downward position so as not to engage the underside 56 of a cargo container. The locking lever 44 is positioned downwardly in an unlocked position, and the air bags 74 are both inflated. This is the position the lift frame would be in when the cargo container is unlocked from the lift frame and fully suspended allowing for a driver to either stow or remove support legs while loading or unloading the cargo container as discussed further below.

In the embodiment shown, the locking mechanism 24 also includes pivot hinges 96 on either end of a longitudinally extending central beam 98 extending between and interconnecting two transversely extending beams 100 on which locking hooks 92 are moveably engaged. The locking hooks are thus rotatably operable on the extending beams 98 and can rotate up and down for locking and unlocking respectively. Two hooks 92 are shown on each beam 100, however, one skilled in the art would understand based on this disclosure that multiple hooks may be provided along each beam as well for additional points of locking and/or that other additional transverse beams may be used.

In a further embodiment, the lift frame 10 as describe above may be incorporated into an vehicle cargo container and lift frame assembly 110 for use with vehicles such as hauling trucks and other vehicles noted herein. The assembly 110 is shown in locked form in FIG. 14 and in fully unlocked and detached form in FIG. 10. The lift frame 10 and cargo container 58 shown to illustrate the invention herein may be varied in the manner noted above. However, the cargo container 58 is preferably configured to be removably seated on the frame 16 so as to cover the frame body 12. The cargo container preferably has a base 94 as noted above that can incorporate various features (not shown) such as frame or bar elements for receiving locking hooks. Such base 94 and further include recesses 102 for receiving support legs 104. Support legs are shown herein as stowable within the base 94. The support legs may be separately provided however and need not be physically incorporated as shown in the preferred embodiment herein. They may be separately provided for use in unloading, or otherwise positioned on the base of the cargo container. The cargo container may also be moveable by crane or similar lifting device to be placed on a separate frame or other container when loading and unloading. However, in the preferred embodiment herein, as shown, stowable support legs 104 are provided so that upon unloading, the cargo container can remain in a free standing and separate position (see FIG. 10) and need not be separately removed by crane or operators need not position free-standing support legs beneath the container. The present invention provides a single operable container that is free standing for use with the locking mechanism and lift frame herein.

Figure 10:
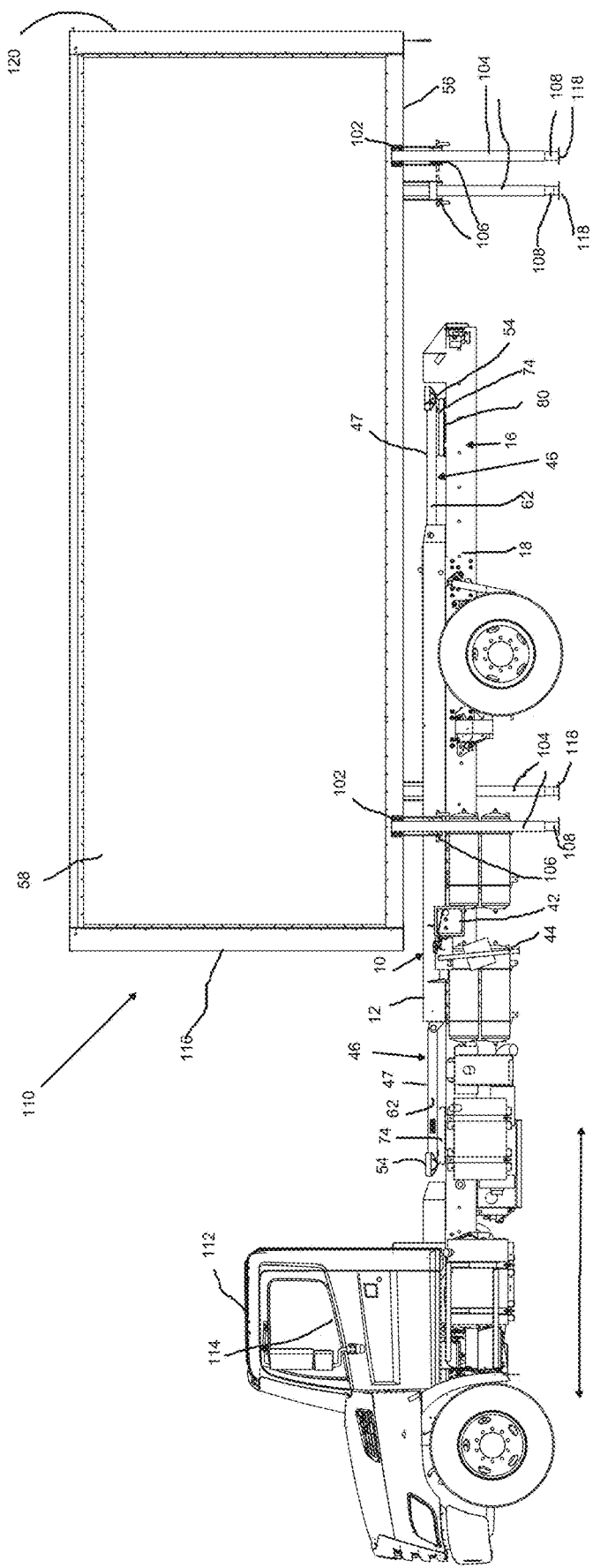
FIG. 10 is a side elevational view showing a vehicle having the lift frame of FIG. 1 attached thereto partially underneath a cargo container according to an embodiment herein in a support position, indicating either a vehicle moving in position to either pull away from an unloaded cargo container having support legs in a support position or backing into position beneath a cargo container having support legs in a support position for loading a cargo container depending on a direction of movement.

As shown, there are preferably a plurality of recesses 102 for receiving legs 104 and four such legs 104 and associated recesses 102 are provided. Two recesses are shown in FIG. 10 on one side of the assembly 110, but it would be understood that two additional recesses may be provided on the opposite side of the cargo container for additional support legs shown there. While four support legs are shown, it will also be understood to one skilled in the art that further legs and recesses may be provided (for example on a longer lift frame and cargo container) for additional support of the cargo container when is a free-standing position as in FIG. 10. The support legs 104 as shown have pivotal hinge guides 106 for supporting and guiding the support legs when retracting them from the cargo container by pulling them transversely outwardly from the recesses and then pivoting them downward into the standing position as shown. The base is also lockably adjustable for height (see adjustable foot 108). The recesses 102 are configured and sized to receive the support legs and may be positioned within a grid (open) or fully closed understructure on the underside of the cargo container to hold the support legs within the base 94 of the cargo container when not in use in a supported manner.

Figure 12:
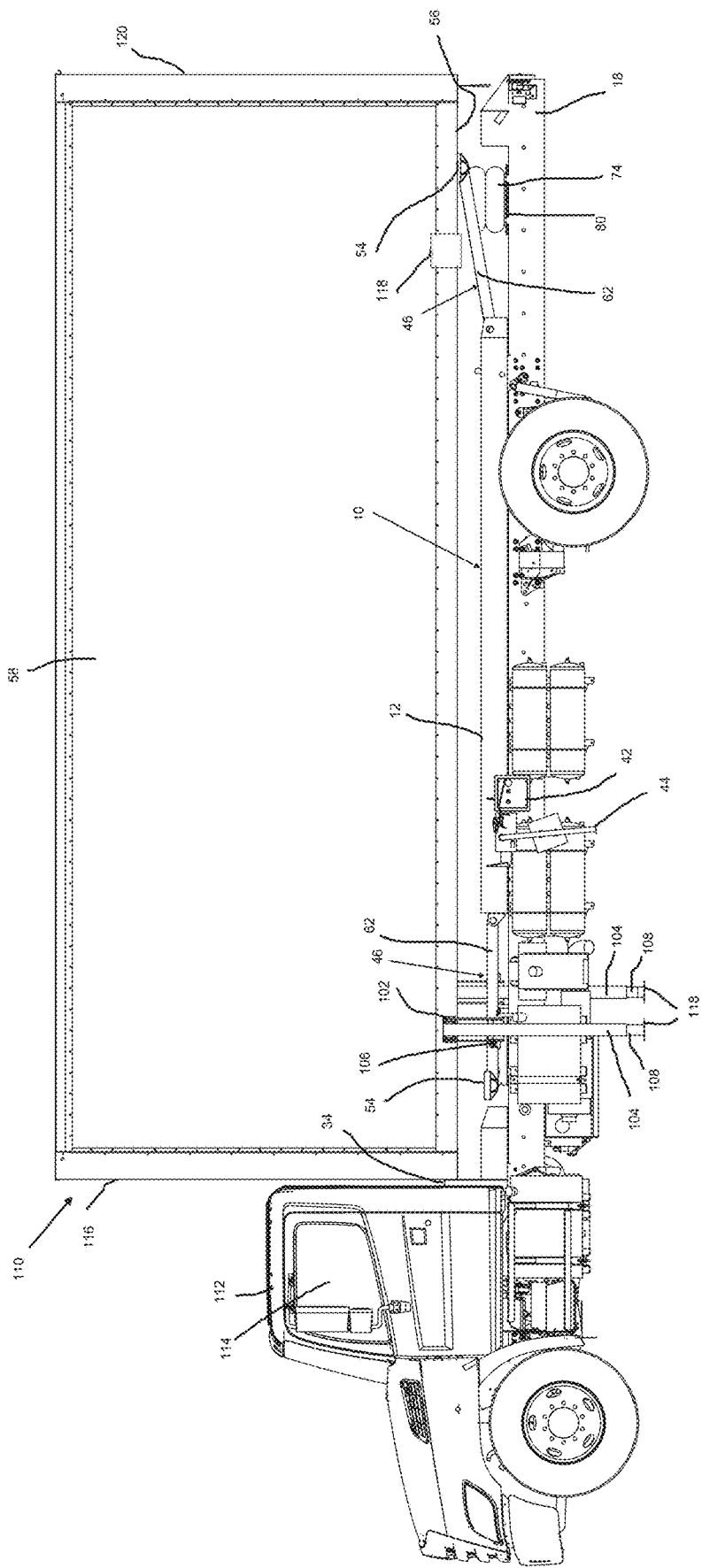
FIG. 12 is a side elevational view of the vehicle of FIG. 10 with a rear lift mechanism of the lift frame of FIG. 1 inflated and rear support legs stowed within a base of the cargo container of FIG. 10.
Figure 13:
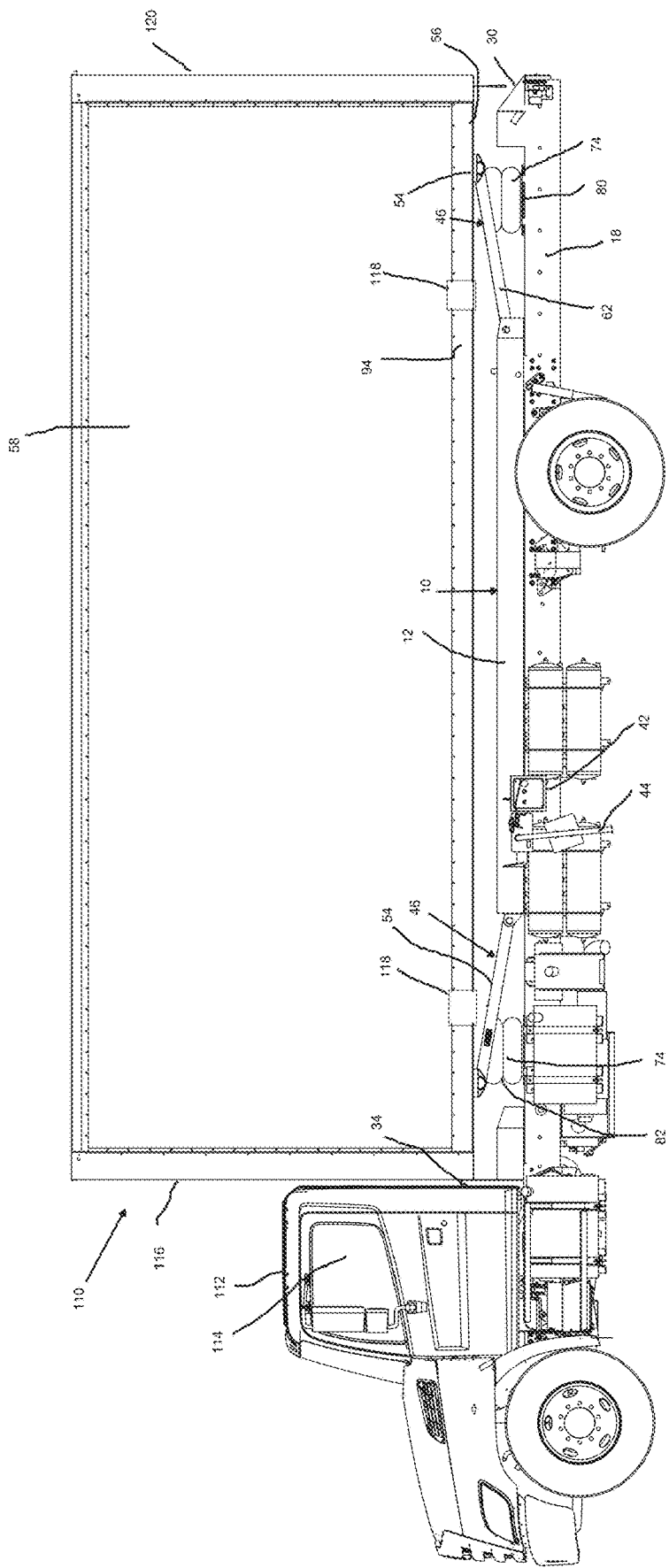
FIG. 13 is a side elevational view of the vehicle of FIG. 10 with a front lift mechanism of the lift frame of FIG. 1 inflated and all support legs stowed within the base of the cargo container of FIG. 10.
Figure 14:
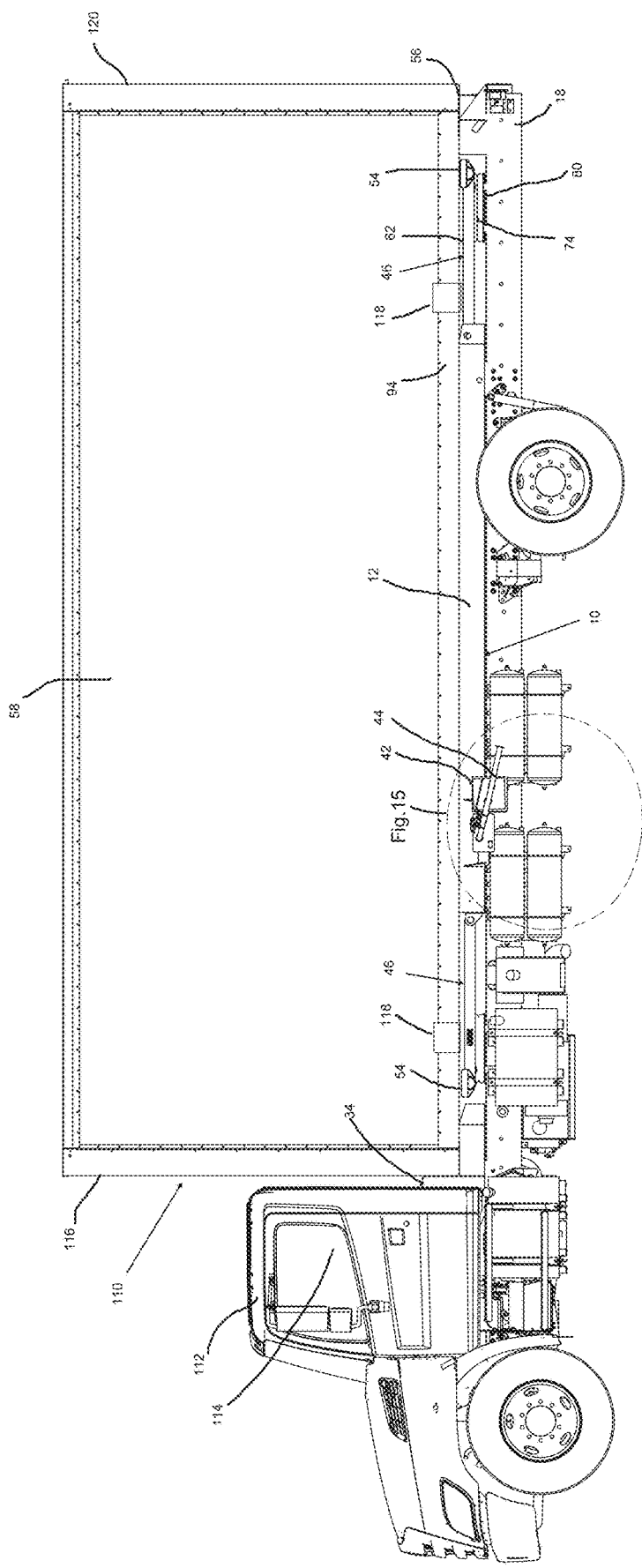
FIG. 14 is a side elevational view of the vehicle of FIG. 10 with the front and rear lift mechanism(s) of the lift frame of FIG. 1 deflated and all support legs stowed within the base of the cargo container of FIG. 10.

The bottom of the support legs have a base surface 112 that supports the load on the leg against a flat surface for stability. When stowed completely in the recesses as shown in FIGS. 12-14, the base 118 is visible and the legs are preferably locked into position with a locking key (not shown) which may be any suitable locking key to ensure lack of movement in transit.

The assembly 110 is preferably attachable and detachable from a vehicle. As described above a variety of vehicles may incorporate an assembly of a cargo container (as defined herein) and a lift frame according to the invention. In FIGS. 10-14, a truck 112 is used as a vehicle having the lift frame 10 attached thereto. Such a truck 112 may incorporate standard electronic controls as are known or to be developed in the art for monitoring various functions of the truck and a semitrailer even if incorporating the lift frame herein, such as for controlling warning and backup lights, tail lights, blinkers, a fifth wheel coupling, lubrication system or hydraulic lifts or air bags for interior tires/wheels, and the like. Such controls may be positioned on the truck, in or on the fifth wheel or on the lift frame. In the embodiment shown, the control feature such as a lock warning light and/or cut off switch and alarm may be provided inside the cab 114 of the truck 112 to allow the driver to know if there is an issue with the lock or other mechanisms. Such a system is to be wired into the electronic controls of the truck and in communication with the lock controls. Such electronic controls for and their wiring are known to those skilled in the art for other controls and should be program to stop automated demounting and/or the lift system as well as to shut down the vehicle and/or provide a warning should the driver attempt to drive the vehicle when the lift frame 10 is not locked to the cargo container. Such a control panel example is shown in FIG. 17, wherein a flood light 122 and body lock alarm 124 for security purposes are in a mounting bracket 126 as shown. Such panel may be mounted on the lift frame, base frame or other area where visible near the locking mechanism. Preferably, the panel is dash mounted for viewing within the cab 114 of the vehicle 112. However, warning lights and alarms may be placed on the lift frame and/or in the cab. Other suitable warning mechanisms and alarms may be provided as well.

The invention also includes methods of loading a cargo container such as cargo container 58 on a lift frame such as lift frame 10 herein to create a vehicle and cargo and lift frame assembly 110 attached to a vehicle such as vehicle 112, and a method for unloading a cargo container 58 from such a lift frame and vehicle cargo container and lift frame assembly 110 so as to detach the cargo container 58 from the lift frame 10. Each such method will be described below using FIGS. 10-14.

Figure 11:
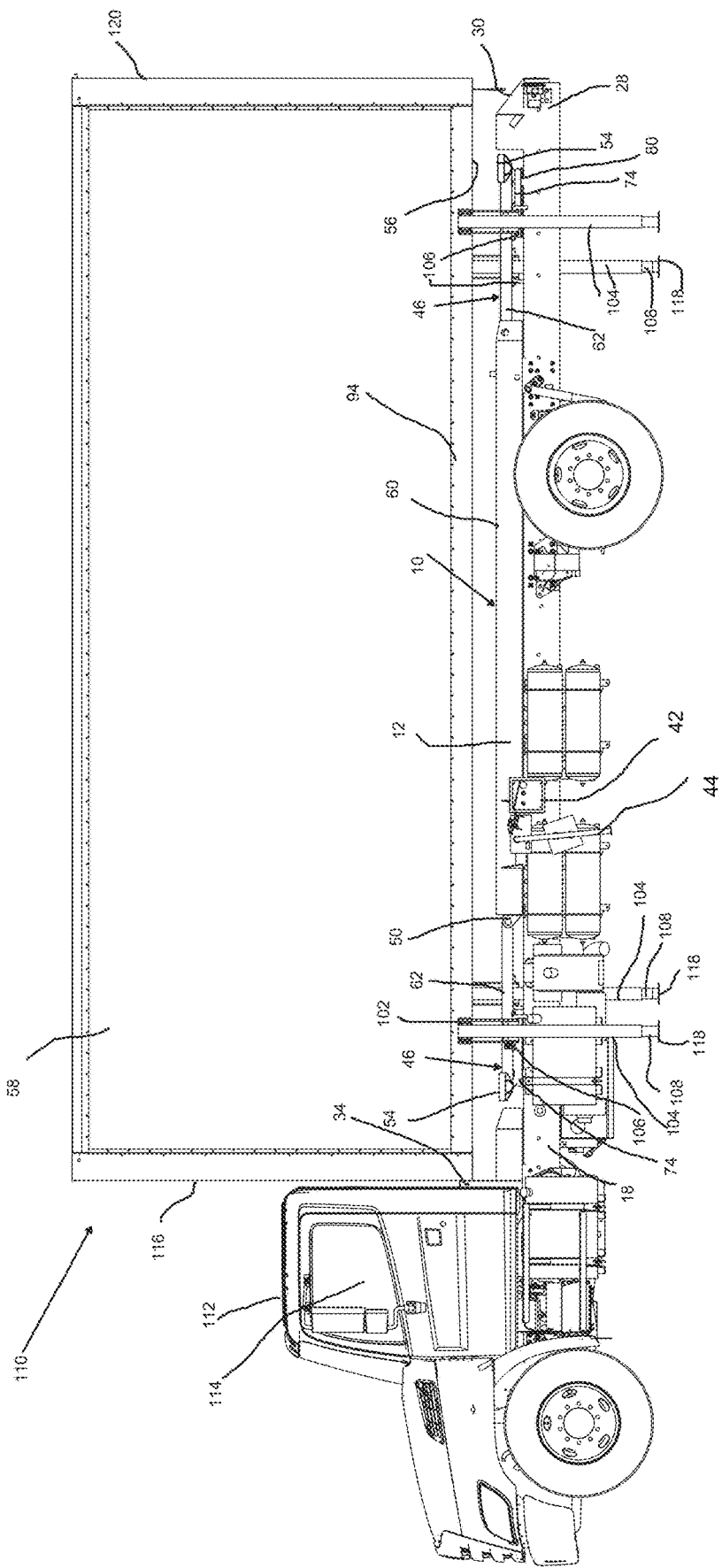
FIG. 11 is a side elevational view of the vehicle of FIG. 10 positioned beneath the cargo container of FIG. 10 over a lift frame as in FIG. 1.

In a method of loading a cargo container on a lift frame to create an assembly, in a first step a lift frame such as lift frame 10 is attached to a vehicle such as vehicle 112. This forms a structure similar to a tractor trailer, but having a lift frame 10 as a trailer therein. The lift frame 10 may be as described above having the frame body 12, one or two lift mechanisms 46 as described above and a source of compressed air 36 in fluid communication with the air bag(s) 74 on the respective lift mechanism(s) 46. The vehicle 112 with the lift frame 10 attached thereto is preferably backed under the cargo container 58 which is in a support position and being supported on a plurality of support legs 104. When in the support position, a vehicle 112 with a lift frame 10 attached may be moved backwards or forwards as shown by directional arrows in FIG. 10. In this loading method, the vehicle 112 and lift frame 10 are moved backwards under the supported cargo container from a vehicle side end 116 of the cargo container, generally leaving cargo container access doors (not shown) for access on a rear end 120 of the cargo container 58. When the lift frame 10 is fully positioned under the cargo container as shown in FIG. 11, the stop preferably abuts or engages the vehicle-side end 116 of the cargo container 58.

In the lift frame embodiment shown, there are two lift mechanism 46, one on either side of the frame body 12. Each is in the deflated position and the locking lever 44 is positioned downward in the unlocked position. Each support leg 104 remains in place supporting the cargo container 58. As shown in FIG. 12, a lifting mechanism 46 positioned near the rear end 28 of the frame 16 is inflated by the source of compressed air 36 so that the lifting surface 54 of the lift body 47 of the lifting mechanism supports and raises the rear facing portion of the cargo container 58 and contacts the underside 56 of the cargo container 58. Inflation of air bags allows for removal of the support legs. In the embodiment shown, inflating this air bag allows for the adjustable support legs 104 located near the rear end 120 of the cargo container to be removed by lifting the two rear located support legs (sequentially by one operator or simultaneously by two operators) so as to pivot them upwards, preferably first by unlocking them, then once pivoted upwards, sliding them so as to stow them in the recesses 102 located in the base 94 of the cargo container 58.

In FIG. 13, the same steps noted in FIG. 12 are repeated for the other lifting mechanism 46 positioned near the vehicle-side end 116 of the cargo container. As shown, the other lifting mechanism is inflated and the support legs 104 that are positioned near the vehicle-side end 116 of the cargo container are also stowed in the recesses 102 of the base 94 of the cargo container in the same manner the prior two support legs were stowed. FIG. 13 thus shows a cargo container 58 fully supported on two lifting surfaces 54 and air bags 74 respectively so as to be above the upper side of the frame body 12. While inflating is shown sequentially to illustrate stowing of the support frames in a manner preferred herein, it should be understood by one skilled in the art in view of this disclosure that the air bag(s) 74 could have been both inflated simultaneously and then all legs lifted and stowed in recesses when the cargo container is fully suspended and all legs lifted and stowed also sequentially or simultaneously depending on the number of operators available to carry out the method and the speed with which the operator(s) wish to carry out the method.

In FIG. 14, the air bag(s) are shown as deflated and the cargo container underside 56 is now supported by the lift frame and in contact with the lifting surfaces 54. The locking mechanism 24 is now in the locking position as demonstrated by the locking lever 44 in the upward position. The air bag(s) may be deflated one at a time or simultaneously. FIG. 14 illustrates the vehicle cargo container and lift frame assembly 110 in a fully assembled and locked position attached to a vehicle 112.

In a method of unloading a cargo container from a lift frame of a vehicle cargo container and lift frame assembly so as to detach the vehicle cargo container from the lift frame of the assembly, the method will now be described also with reference to FIGS. 10-14.

Starting with FIG. 14, a truck arrives with a cargo container and lift frame assembly in a fully assembled and locked position. The lift frame 10 is positioned on the top portion of the frame 16. The lift frame is first unlocked from the frame body 12. The unlocking is done by depressing the locking lever 44 into a downward position so as to disengage the locking mechanism 24.

After unlocking, one of the inflatable air bag(s) is inflated (although both may be inflated at the same time) as shown in FIG. 13. The support legs 104 are positioned in a support position. To do so, such support legs may be removed from the recesses of the cargo container simultaneously while both air bags are inflated or may be removed in sequence as shown in FIG. 12, wherein a first set of support legs 104 are removed from the recesses 102 near the vehicle-side end 116 of the cargo container and are positioned in the support position.

When the support legs 104 are in place, the air bag 74 near such support legs may be deflated as shown in FIG. 12 while the other air bag is still inflated. If done simultaneously while both air bags are inflated, all legs would be removed and then both air bags deflated until the assembly appears as in FIG. 11.

If done sequentially, after one set of legs is in position and one air bag deflated, then the other end of the cargo container may be similarly re-positioned. For example, as shown in FIG. 12, once the vehicle-side end support legs are in position and the air bag deflated, then as shown in FIG. 11, the same steps may be carried out on the rear end of the assembly, wherein the lift mechanism 46 positioned near the rear end of the frame 18 is deflated and the support legs 104 located near the rear end 120 of the cargo container are removed from the recesses, i.e., they are extended transversely outwardly from the recesses and pivotably guided downward into the support position, with the adjustable legs 108 adjusted and locked in place, and the support leg base 118 in contact with the ground. In either a sequential or simultaneous deflation, the support legs are put into the support position until the assembly is as shown in FIG. 11 which shows an unlocked lift frame attached to a truck beneath a fully supported cargo container supported by support legs 104.

Once this is achieved, the vehicle with the lift frame attached is driven away from the supported cargo container leaving it behind on the support legs. The vehicle is driven away with the cargo container detached in a forward direction as shown in directional arrows of FIG. 10 so as to pull away from the cargo container 58.

FIG. 16 illustrates a control system 128 for the air compressor and lift frame herein. With reference to control panel 42 as in FIG. 15, and using the diagram in FIG. 16, the two toggle switches noted above 88, 90 are operably connected to the system via a valve 130 associated with toggle 88 that lifts and lowers a selected air bag. The toggle 90 operates a valve 132 for selection of the front and/or rear air bag. The valve can be selected and varied so as to operate one or the other air bag independently or simultaneously by user preference. Further the valve 130 may be configured to fully inflate or deflate or to partially inflate or deflate by preference. The pressure flow from air tanks 36 flows through the selector valves in a directed flow as selected through pressure control/limiting valve(s) 134 to ensure that overly pressurized air does not impact operation of the selected equipment. Air flows towards the air bags 74 through an inflate/deflate control valve 140 which can be or include a spring loaded check valve. Further a control valve 136 coupled with a further spring loaded check valve 138 may be installed in communication with inflate/deflate control valve 140.

Air tanks 36 preferably incorporate a relief valve 142 to relieve excessive pressure and for safety reasons. A test connection 144 is also provided to the air tanks 36. The tanks are also preferably equipped with a drain valve 146. Other system configurations and assemblies are possible for carrying out variations in embodiments herein in accordance with control system techniques known in the art or to be developed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A lift frame for a vehicle, comprising:
   a frame body on a top portion of a frame, the frame body extending from a first end to a second end;
   a lift mechanism moveable with respect to the first end of the frame body, the lift mechanism comprising:
      a lift body having a first end and a second end, a lifting surface on the first end of the lift body and the second end of the lift body being positioned so as to be movable with respect to the first end of the frame body, wherein the lifting surface is positioned to engage an underside of a cargo container when placed on an upper side of the frame body;
      an inflatable air bag having an upper side and a lower side and mounted on the lower side to a platform positioned on the frame beneath the lift body, wherein the inflatable air bag is connected on the upper side thereof to a mounting surface attached to the lift body; and a source of compressed air in fluid communication with the inflatable air bag, wherein the frame body includes a locking mechanism that includes a plurality of locking hooks rotatably operable on at least one transversely extending beam interconnected by a longitudinally extending beam, wherein the hooks are actuated by a locking lever.

2. The lift frame according to claim 1, wherein the lift body comprises at least two extending lift arms, each pivotably mounted on the second end of the lift body to the first end of the frame body.

3. The lift frame according to claim 2 wherein the lifting surface is attached to the first end of the lift body and is connected to at least two of the extending lift arms.

4. The lift frame according to claim 2, wherein the lifting surface is located on mounting flanges rotatably positioned on a bar extending between two of the at least two extending lift arms, which two extending lift arms are located on outermost sides of the lift body.

5. The lift frame according to claim 1, wherein the frame comprises a longitudinally extending base frame positioned beneath and supporting a lower side of the frame body.

6. The lift frame according to claim 1, wherein the source of compressed air comprises a compressor, an electronic control panel for operating the compressor, a pressure gauge and conduit for allowing compressed air to be fed into the lower side of the inflatable air bag.

7. The lift frame according to claim 1, comprising a second lift mechanism moveable with respect to the second end of the frame body, the second lift mechanism comprising:
a second lift body having a first end and a second end, a second lifting surface on the second end of the second lift body and the first end of the second lift body being positioned so as to be movable with respect to the second end of the frame body, wherein the second lifting surface is positioned to engage an underside of a cargo container when placed on an upper side of the frame body;
a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and
wherein the source of compressed air is also in fluid communication with the second inflatable air bag.

8. The lift frame according to claim 7, wherein the second lift body comprises at least two extending lift arms, each pivotably mounted on the first end of the second lift body to the second end of the frame body.

9. The lift frame according to claim 8, wherein the second lifting surface is attached to the second end of the lift body and is connected to at least two of the extending lift arms of the second lift body.

10. The lift frame according to claim 8, wherein the second lifting surface is located on mounting flanges rotatably positioned on a bar extending between two of the at least two extending lift arms of the second lift body, which two extending lift arms are located on outermost sides of the second lift body.

11. The lift frame according to claim 1, wherein the locking lever is positioned on the frame body.

12. The lift frame according to claim 1, wherein the frame comprises a longitudinally extending base frame positioned beneath and supporting a lower side of the frame body, wherein a vehicle-side end of the base frame comprises a loading stop for a cargo container when loaded on the frame and a rear end of the base frame is configured for seating a cargo container when loaded on the frame.

13. A lift frame for a vehicle, comprising:
a frame body on a top portion of a frame, the frame body extending from a first end to a second end;
a first lift mechanism moveable with respect to the first end of the frame body, the first lift mechanism comprising:
a first lift body having a first end and a second end, a first lifting surface on the first end of the first lift body and the second end of the first lift body being positioned so as to be movable with respect to the first end of the frame body, wherein the first lifting surface is positioned to engage an underside of a cargo container when placed on an upper side of the frame body;
a first inflatable air bag having an upper side and a lower side and mounted on the lower side to a first platform positioned on the frame beneath the first lift body, wherein the first inflatable air bag is connected on the upper side thereof to a first mounting surface attached to the first lift body;
a second lift mechanism moveable with respect to the second end of the frame body, the second lift mechanism comprising:
a second lift body having a first end and a second end, a second lifting surface on the second end of the second lift body and the first end of the second lift body being positioned so as to be movable with respect to the second end of the frame body, wherein the second lifting surface is positioned to engage an underside of a cargo container when placed on the upper side of the frame body;
a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and
a source of compressed air in fluid communication with the first and the second inflatable air bags, wherein the frame body includes a locking mechanism that includes a plurality of locking hooks rotatably operable on at least one transversely extending beam interconnected by a longitudinally extending beam, wherein the hooks are actuated by a locking lever.

14. The lift frame according to claim 13, wherein the first lift body comprises at least two extending lift arms, each pivotably mounted on the second end of the lift body to the first end of the frame body and the second lift body comprises at least two extending lift arms, each pivotably mounted on the first end of the second lift body to the second end of the frame body.

15. The lift frame according to claim 14, wherein the first lifting surface is attached to the first end of the first lift body and is connected to at least two of the extending lift arms of the first lift body and wherein the second lifting surface is attached to the second end of the second lift body and is connected to at least two of the extending lift arms of the second lift body.

16. The lift frame according to claim 14, wherein the first lifting surface is located on mounting flanges rotatably positioned on a bar extending between two of the at least two extending lift arms of the first lift body, which two extending lift arms are located on outermost sides of the first lift body, and wherein the second lifting surface is located on mounting flanges rotatably positioned on a bar extending between two of the at least two extending lift arms of the second lift body, which two extending lift arms are located on outermost sides of the second lift body.

17. The lift frame according to claim 13, wherein the frame comprises a longitudinally extending base frame positioned beneath and supporting a lower side of the frame body.

18. The lift frame according to claim 13, wherein the source of compressed air comprises a compressor, an electronic control panel for operating the compressor, a pressure gauge and conduit for allowing compressed air to be fed into the lower side of the inflatable air bag.

19. The lift frame according to claim 13, wherein the locking lever is positioned on the frame body.

20. The lift frame according to claim 13, wherein the frame comprises a longitudinally extending base frame positioned beneath and supporting a lower side of the frame body, wherein a vehicle-side end of the base frame comprises a loading stop for a cargo container when loaded on the frame and a rear end of the base frame is configured for seating a cargo container when loaded on the frame.

21. A lift frame for a vehicle, comprising:
a frame body on a top portion of a frame, the frame body extending from a first end to a second end;
a lift mechanism moveable with respect to the first end of the frame body, the lift mechanism comprising:
a lift body having a first end and a second end, a lifting surface located on at least one mounting flange rotatably positioned on the first end of the lift body and the second end of the lift body being positioned so as to be movable with respect to the first end of the frame body, wherein the lifting surface is positioned to directly engage an underside of a cargo container when placed on an upper side of the frame body;
an inflatable air bag having an upper side and a lower side and mounted on the lower side to a platform positioned on the frame beneath the lift body, wherein the inflatable air bag is connected on the upper side thereof to a mounting surface attached to the lift body; and
a source of compressed air in fluid communication with the inflatable air bag.

22. The lift frame according to claim 21, wherein the lift body comprises at least two extending lift arms, each pivotably mounted on the second end of the lift body to the first end of the frame body.

23. The lift frame according to claim 22, wherein the lifting surface is attached to the first end of the lift body and is connected to at least two of the extending lift arms.

24. The lift frame according to claim 22, Wherein there are two mounting flanges located on a bar extending between two of the at least two extending lift arms, which two extending lift arms are located on outermost sides of the lift body.

25. The lift frame according to claim 21, wherein the frame comprises a longitudinally extending base frame positioned beneath and supporting a lower side of the frame body.

26. The lift frame according to claim 21, wherein the source of compressed air comprises a compressor, an electronic control panel for operating the compressor, a pressure gauge and conduit for allowing compressed air to be fed into the lower side of the inflatable air bag.

27. The lift frame according to claim 21, comprising a second lift mechanism moveable with respect to the second end of the frame body, the second lift mechanism comprising:
a second lift body having a first end and a second end, a second lifting surface located on at least one mounting flange rotatably positioned on the second end of the second lift body and the first end of the second lift body being positioned so as to be movable with respect to the second end of the frame body, wherein the second lifting surface is positioned to directly engage an underside of a cargo container when placed on an upper side of the frame body;
a second inflatable air bag having an upper side and a lower side and mounted on the lower side to a second platform positioned on the frame beneath the second lift body, wherein the second inflatable air bag is connected on the upper side thereof to a second mounting surface attached to the second lift body; and
wherein the source of compressed air is also in fluid communication with the second inflatable air bag.

28. The lift frame according to claim 27, wherein the second lift body comprises at least two extending lift arms, each pivotably mounted on the first end of the second lift body to the second end of the frame body.

29. The lift frame according to claim 28, wherein the second lifting surface is attached to the second end of the lift body and is connected to at least two of the extending lift arms of the second lift body.

30. The lift frame according to claim 28, wherein there are two mounting flanges on a bar extending between two of the at least two extending lift arms of the second lift body, which two extending lift arms are located on outermost sides of the second lift body.

31. The lift frame according to claim 21, wherein the frame body includes a locking mechanism.

32. The lift frame according to claim 31, wherein the locking mechanism includes a plurality of locking hooks rotatably operable on at least one transversely extending beam interconnected by a longitudinally extending beam, wherein the hooks are actuated by a locking lever positioned on the frame body.

33. The lift frame according to claim 21, wherein the frame comprises a longitudinally extending base frame positioned beneath and supporting a lower side of the frame body, wherein a vehicle-side end of the base frame comprises a loading stop for a cargo container when loaded on the frame and a rear end of the base frame is configured for seating a cargo container when loaded on the frame.

* * * * *